(12) United States Patent
Nishiguchi et al.

(10) Patent No.: US 8,622,536 B2
(45) Date of Patent: Jan. 7, 2014

(54) INK JET AQUEOUS INK, INK CARTRIDGE, AND INK JET RECORDING METHOD

(75) Inventors: Kenji Nishiguchi, Yokohama (JP); Junichi Sakai, Machida (JP); Mitsuru Ishii, Kamagaya (JP)

(73) Assignee: Canon Kabushiki Kaisha, Tokyo (JP)

( * ) Notice: Subject to any disclaimer, the term of this patent is extended or adjusted under 35 U.S.C. 154(b) by 196 days.

(21) Appl. No.: 13/216,931

(22) Filed: Aug. 24, 2011

(65) Prior Publication Data

US 2012/0050388 A1    Mar. 1, 2012

(30) Foreign Application Priority Data

Aug. 31, 2010  (JP) ................. 2010-194044

(51) Int. Cl.
*C09D 11/00*    (2006.01)
(52) U.S. Cl.
USPC ......................................................... 347/100
(58) Field of Classification Search
USPC ......................................................... 347/100
See application file for complete search history.

(56) References Cited

U.S. PATENT DOCUMENTS

| | | | | |
|---|---|---|---|---|
| 7,222,952 B2 * | 5/2007 | Uejima | .......................... | 347/100 |
| 2003/0109600 A1 * | 6/2003 | Shirota et al. | ................. | 523/160 |
| 2004/0257417 A1 * | 12/2004 | Jackson et al. | ................ | 347/100 |

FOREIGN PATENT DOCUMENTS

| | | | | |
|---|---|---|---|---|
| JP | 2006-282822 A | 10/2006 | | |
| JP | 2009084397 A | * 4/2009 | ............. | C09D 17/00 |

* cited by examiner

*Primary Examiner* — Laura Martin
(74) *Attorney, Agent, or Firm* — Canon USA Inc. IP Division

(57) ABSTRACT

An ink jet aqueous ink including an ABC triblock polymer and a polymer emulsion, wherein the above-described ABC triblock polymer is formed from an A block having a unit represented by the following general formula (1), a B block having a unit represented by the following general formula (2), and a C block having a unit represented by the following general formula (3).

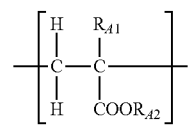

General formula (1)

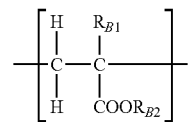

General formula (2)

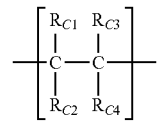

General formula (3)

11 Claims, No Drawings

INK JET AQUEOUS INK, INK CARTRIDGE, AND INK JET RECORDING METHOD

BACKGROUND OF THE INVENTION

1. Field of the Invention

The present invention relates to an ink jet aqueous ink, an ink cartridge by using the above-described ink, and an ink jet recording method.

2. Description of the Related Art

In recent years, an ink jet recording system has been developed in application to not only printing on a permeable recording medium, e.g., paper, but also printing on a nonpermeable recording medium by using plastic, e.g., poly vinyl chloride and polyethylene terephthalate. Heretofore, a nonaqueous solvent ink has been the mainstream of inks used for the nonpermeable recording medium. However, the water-based ink exhibiting higher level of environmental safety has also been studied recently.

In the case where a water-based ink, in which a main solvent is water, is used as an ink for the nonpermeable recording medium, a function of dissolving a surface of a recording medium is weak in contrast to the nonaqueous solvent ink, in which a main solvent is an organic solvent. Therefore, it is necessary that a binder is further contained to bring a coloring material into intimate contact with the recording medium. As for the binder, a water-based ink containing a polymer emulsion has been proposed (refer to Japanese Patent Laid-Open No. 2006-282822). Japanese Patent Laid-Open No. 2006-282822 discloses an invention related to a water-based pigment ink for a plastic film containing a thermoplastic polymer and a cyclic amide compound, which are dispersed in the ink. In this regard, it is disclosed that the cyclic amide compound dissolves the surface of a plastic film, the thermoplastic polymer film is formed through vaporization of water at the same time and, thereby, adhesion to the film is improved.

SUMMARY OF THE INVENTION

An ink jet aqueous ink according to aspects of the present invention includes an ABC triblock polymer and a polymer emulsion, wherein the above-described ABC triblock polymer is formed from an A block having a unit represented by the following general formula (1), a B block having a unit represented by the following general formula (2), and a C block having a unit represented by the following general formula (3),

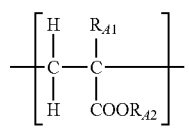

General formula (1)

in the general formula (1), $R_{A1}$ represents a hydrogen atom or a methyl group and $R_{A2}$ represents an alkyl group having the carbon number of 1 to 8 or a cycloalkyl group having the carbon number of 4 to 8,

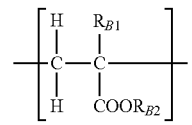

General formula (2)

in the general formula (2), $R_{B1}$ represents a hydrogen atom or a methyl group and $R_{B2}$ represents an alkyl group having the carbon number of 4 to 8, a cycloalkyl group having the carbon number of 4 to 8, or a hydroxy alkyl group having the carbon number of 2 to 8, and

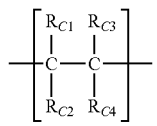

General formula (3)

in the general formula (3), at least one of $R_{C1}$ to $R_{C4}$ is a —COOH group, an —$R_{C5}$—COOH group, or a salt thereof, the remainder is a hydrogen atom, an alkyl group having the carbon number of 1 to 8, or a cycloalkyl group having the carbon number of 4 to 8, and $R_{C5}$ is an alkylene group having the carbon number of 1 to 5.

Further features of the present invention will become apparent from the following description of exemplary embodiments.

DESCRIPTION OF THE EMBODIMENTS

Aspects of the present invention will be described below in detail with reference to embodiments. An ink jet aqueous ink (hereafter referred to as an "ink") according to aspects of the present invention includes specific ABC triblock polymer and polymer emulsion. By the way, at least a part of components constituting salts may dissociate in an ink and be present as ions. However, in the present invention, this is included in the expression of "salt is contained" for the sake of convenience.

According to studies by the present inventors, regarding the water-based pigment ink by using the polymer emulsion in the related art, although the adhesion to the nonpermeable recording medium was improved, the storage stability, the ejection stability, and the like of the ink were not sufficient. Furthermore, it was made clear that the scratch resistance of an image did not reach a required level.

In Japanese Patent Laid-Open No. 2006-282822, the thermoplastic polymer is dispersed in the ink and, thereby, the proportion of the content of the polymer relative to the content of the water in the ink is reduced. Consequently, the amount of the resulting coating of the polymer becomes small relative to the amount of the coloring material applied to the recording medium, so that sufficient scratch resistance is not given to the image. Moreover it was made clear that the storage stability and the ejection stability of the ink were insufficient because the polymer was not designed from the viewpoint of the storage stability and the ejection stability of the water-based ink.

In order to obtain ink exhibiting high storage stability and ejection stability and producing an image exhibiting high scratch resistance, the present inventors performed a variety of studies on polymer emulsions used in the ink. As for the method for enhancing the storage stability and the ejection stability of the ink, a method in which the content of water in the polymer emulsion is increased and a method in which the polymer emulsion is allowed to have a high-hydrophilicity structure are mentioned. However, regarding the former, the content of the polymer emulsion is reduced relative to the content of water in the ink and, thereby, the scratch resistance of the image is reduced as in Japanese Patent Laid-Open No. 2006-282822. Regarding the latter, a sufficient amount of polymer emulsion relative to the amount of coloring material applied to the recording medium can be contained in the ink. However, the hydrophilicity of the resulting image is high, and the amounts of water and water-soluble solvent remaining in the image increase and, thereby, the scratch resistance is reduced. That is, regarding the methods in the related art, there was a relationship of trade-off between the storage stability and the ejection stability of the ink and the scratch resistance of the image.

In consideration of the above-described results, the present inventors studied the problem over and over again, and the present invention has been made, in which a specific ABC triblock polymer was further contained in a water-based ink containing a polymer emulsion. In general, if a polymer is further contained into a water-based ink containing a polymer emulsion, the scratch resistance of the image is improved, although the storage stability and the ejection stability are further reduced. However, it was found that in the case where a polymer having a specific ABC triblock structure was used, the compatibility between the storage stability and the ejection stability of the ink and the scratch resistance of the image, which had been in the relationship of trade-off previously, was able to be ensured.

The specific ABC triblock polymer used for the ink according to aspects of the present invention is concretely formed from the A block having a unit represented by the following general formula (1), the B block having a unit represented by the following general formula (2), and the C block having a unit represented by the following general formula (3),

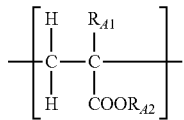

General formula (1)

in the general formula (1), $R_{A1}$ represents a hydrogen atom or a methyl group and $R_{A2}$ represents an alkyl group having the carbon number of 1 to 8 or a cycloalkyl group having the carbon number of 4 to 8,

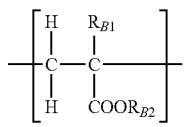

General formula (2)

in the general formula (2), $R_{B1}$ represents a hydrogen atom or a methyl group and $R_{B2}$ represents an alkyl group having the carbon number of 4 to 8, a cycloalkyl group having the carbon number of 4 to 8, or a hydroxy alkyl group having the carbon number of 2 to 8, and

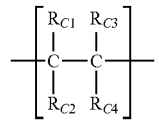

General formula (3)

in the general formula (3), at least one of $R_{C1}$ to $R_{C4}$ is a —COOH group, an —$R_{C5}$—COOH group, or a salt thereof, the remainder is a hydrogen atom, an alkyl group having the carbon number of 1 to 8, or a cycloalkyl group having the carbon number of 4 to 8, and $R_{C5}$ is an alkylene group having the carbon number of 1 to 5.

In the ABC triblock polymer used for the ink according to aspects of the present invention, the A block is a block having a high affinity for the polymer emulsion, and the C block is a block having a high affinity (hydrophilicity) for water or aqueous medium serving as a dispersion medium in the ink. Furthermore, the ABC triblock polymer used for the ink according to aspects of the present invention has the B block having the hydrophilicity lower than that of the C block between the A block and the C block.

In the ink containing the polymer emulsion, the triblock polymer used for the ink according to aspects of the present invention takes on a structure in which one end of the molecular chain is adsorbed by the particle surface of the polymer emulsion in the ink through the A block and the other end is oriented in the dispersion medium because of the C block. The polymer emulsion behaves as if the surface is charged anionically because the ABC triblock polymer takes on such a structure, and the polymer emulsion is dispersed in the ink stably due to the repulsion among the individual particles. Moreover, polymer emulsion which is deposited in the vicinity of an ejection orifice because of loss of dispersion stability due to heat or pressure applied to the ink during ejection is reduced, so that the ejection stability of the ink is improved. At this time, in the case where an AC diblock polymer, in which the A block and the C block are directly bonded without through the B block, is used in contrast to the ABC triblock polymer used for the ink according to aspects of the present invention, the above-described effect of improving the storage stability and the ejection stability are not obtained. The reason for this is not certain, but the present inventors believe it may be for the reason as described below. In the case where the AC diblock polymer is used, the A block and the C block are present close to each other and, thereby, the C block is present in the vicinity of the polymer emulsion surface. Therefore, it is difficult to take on a structure spread in the dispersion medium sufficiently. In addition, there are polymer chains which are adsorbed while involving a part of the C blocks when the A block is adsorbed by the surface of the polymer emulsion particle. It is believed that regarding the AC diblock polymer, an effect resulting from containment of the C block is not exert because of such a phenomenon.

On the basis of the above-described mechanism, the compatibility between the storage stability and the ejection stability of the ink and the scratch resistance of the image, which has been in the relationship of trade-off with respect to the methods in the related art, can be ensured, by effective functions of the individual configurations of the ink according to aspects of the present invention. The ink according to aspects of the present invention can be used for a nonpermeable recording medium because the above-described effects according to aspects of the present invention are obtained remarkably. Furthermore, the effects according to aspects of the present invention are obtained sufficiently in the case of use for a recording medium having an ink-receiving layer and normal paper and other recording media.

Ink

Each of components constituting the ink according to aspects of the present invention will be described below.

ABC Triblock Polymer

In the present invention, the "ABC triblock polymer" refers to a polymer having a structure in which three different types of polymers, the A block, the B block, and the C block, are joined by covalent bonds in the order of A, B, and C. Each of the blocks may be a polymer produced by homopolymerizing a single type of monomer or a random polymer produced by random-copolymerizing at least two types of monomers insofar as the polymer is different from the other two blocks. However, the case where each block is a block polymer of at least two types of monomers, such as, the case where the A block is furthermore a binary block polymer, is not included in the "ABC triblock polymer" in aspects of the present invention. By the way, hereafter the terms "(meth)acrylic acid" and "(meth)acrylate" refer to "acrylic acid, methacrylic acid" and "acrylate, methacrylate", respectively.

Monomer Constituting A Block

As for the monomer constituting the A block, which has a unit represented by the above-described general formula (1), through polymerization, compounds represented by the general formula (4) are mentioned.

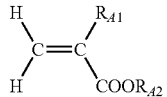

General formula (4)

In the general formula (1), $R_{A1}$ represents a hydrogen atom or a methyl group and $R_{A2}$ represents a straight-chain or branched alkyl group having the carbon number of 1 to 8, a branched alkyl group, or a cycloalkyl group having the carbon number of 4 to 8.

As for the compounds represented by the general formula (4), (meth)acrylic acid alkyl esters synthesized from (meth)acrylic acid and straight-chain or branched alkyl alcohols having the carbon number of 1 to 8 or cycloalkyl alcohols having the carbon number of 4 to 8 are mentioned. Specific examples include methyl(meth)acrylate, n-butyl(meth)acrylate, 2-ethylhexyl(meth)acrylate, and cyclohexyl(meth)acrylate. In aspects of the present invention, the A block may be formed by homopolymerizing only one type of compound represented by the above-described general formula (4), or the A block may be formed by random-copolymerizing at least two types thereof. The A block may be formed by random-copolymerizing the compound represented by the general formula (4) and "other monomer" described later. At that time, the content (percent by mass) of the "other monomer" may be 35.0 percent by mass or less relative to the content (percent by mass) of the A block.

According to aspects of the present invention, the A block can be formed by polymerizing only the compound represented by the general formula (4), that is, the content of the "other monomer" may be 0 percent by mass relative to the content (percent by mass) of the A block. As for the unit constituting the A block, the same type of unit as the unit constituting the polymer emulsion can be used from the viewpoint of the affinity for the polymer emulsion.

The proportion (percent by mass) of the A block in the ABC triblock polymer may be 40.0 percent by mass or more and 80.0 percent by mass or less relative to a total mass of the ABC triblock polymer. If the proportion is less than 40.0 percent by mass, segments exhibiting a high affinity for the polymer emulsion are reduced and, therefore, the effect of improving the ejection stability of the ink is not obtained sufficiently in some cases. If the proportion is more than 80.0 percent by mass, segments exhibiting a high affinity for the polymer emulsion increase and segments exhibiting high hydrophilicity are reduced relatively, so that the effect of improving the ejection stability of the ink is not obtained sufficiently in some cases.

Monomer Constituting B Block

As for the monomer constituting the B block, which has a unit represented by the above-described general formula (2), through polymerization, compounds represented by the general formula (5) are mentioned.

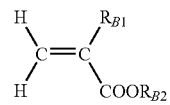

General formula (5)

In the general formula (5), $R_{B1}$ represents a hydrogen atom or a methyl group and $R_{B2}$ represents a straight-chain or branched alkyl group having the carbon number of 4 to 8, a cycloalkyl group having the carbon number of 4 to 8, or a hydroxy alkyl group having the carbon number of 2 to 8.

As for the compounds represented by the general formula (5), (meth)acrylic acid alkyl esters, e.g., n-butyl(meth)acrylate, tert-butyl(meth)acrylate, 2-ethylhexyl(meth)acrylate, and cyclohexyl(meth)acrylate; and (meth)acrylic acid alkyl esters, e.g., 2-hydroxyethyl(meth)acrylate and 3-methyl-5-hydroxypentyl(meth)acrylate. According to aspects of the present invention, the B block may be formed by homopolymerizing only one type of compound represented by the above-described general formula (5), or the B block may be formed by random-copolymerizing at least two types thereof. The B block may be formed by random-copolymerizing the compound represented by the general formula (5) and "other monomer" described later in order that desired properties are obtained. The content (percent by mass) of the "other monomer" may be 35.0 percent by mass or less relative to the content (percent by mass) of the B block. The content (percent by mass) of the B block may be 2.7 percent by mass or more and 53.0 percent by mass or less relative to a total mass of the ABC triblock polymer.

According to aspects of the present invention, in particular, the B block can be formed by random-copolymerizing the compound represented by the general formula (5) and an acidic monomer, e.g., (meth)acrylic acid, among the "other monomers". At that time, it may be necessary that the acid value of the B block is smaller than the acid value of the C block. In the case where the B block has the above-described structure, the B block has the hydrophilicity between that of the A block and that of the C block, and the A block and the C block are functionally separated more clearly. Consequently, the above-described effects according to aspects of the present invention can be achieved at a higher level. In this regard, the "acid value (mgKOH/g) of the B block" refers to the amount (mg) of sodium hydroxide required for neutralizing 1 g of polymer assumed to be formed having the same composition as that of the B block. The acid value of the A block and the acid value of the C block are defined in the same manner.

Monomer Constituting C Block

As for the monomer constituting the C block, which has a unit represented by the above-described general formula (3), through polymerization, compounds represented by the general formula (6) are mentioned.

General formula (6)

In the general formula (6), at least one of $R_{C1}$ to $R_{C4}$ is a —COOH group, an —$R_{C5}$—COOH group, or a salt thereof, the remainder is a hydrogen atom, a straight-chain or branched alkyl group having the carbon number of 1 to 8, or a cycloalkyl group having the carbon number of 4 to 8, and $R_{C5}$ is a substituted or unsubstituted alkylene group having the carbon number of 1 to 5.

Examples of compounds represented by the general formula (6) include unsaturated carboxylic acids, e.g., (meth)acrylic acid, maleic acid, itaconic acid, and fumaric acid, derivatives thereof, and salts thereof. Examples of salts include alkali metal (lithium, sodium, potassium, and the like) salts, ammonium salts, and organic ammonium salts. Among them, (meth)acrylic acid can be employed. As for the salt, sodium salts or potassium salts can be employed. According to aspects of the present invention, the C block may be formed by homopolymerizing only one type of compound represented by the above-described general formula (6) or the C block may be formed by random-copolymerizing at least two types. Alternatively, the C block may be formed by random-copolymerizing the compound represented by the general formula (6) and "other monomer" described later in order that desired properties are obtained. In that case, the content (percent by mass) of the "other monomer" may be 35.0 percent by mass or less relative to the content (percent by mass) of the C block. According to aspects of the present invention, the C block can be formed by polymerizing only the compound represented by the general formula (6), that is, the content of the "other monomer" may be 0 percent by mass relative to the content (percent by mass) of the C block. The content (percent by mass) of the C block may be 2.0 percent by mass or more and 16.0 percent by mass or less relative to a total mass of the ABC triblock polymer.

Other Monomers

Each of A to C blocks constituting the ABC triblock polymer used for the ink according to aspects of the present invention may be formed by random-copolymerizing the compound represented by the above-described general formulae (4) to (6), respectively, and the "other monomer" within the range in which the effects according to aspects of the present invention are obtained. In that case, the content (percent by mass) of the "other monomer" may be 35.0 percent by mass or less relative to the content (percent by mass) of the block for which the "other monomer" is used.

Specific examples of the "other monomers" include (meth)acrylic acid; (meth)acrylic acid ester compounds, e.g., methoxyethyl(meth)acrylate, ethoxyethyl(meth)acrylate, diethylene glycol(meth)acrylate, triethylene glycol(meth)acrylate, tetraethylene glycol(meth)acrylate, polyethylene glycol (meth)acrylate, methoxydiethylene glycol(meth)acrylate, methoxytriethylene glycol(meth)acrylate, methoxytetraethylene glycol(meth)acrylate, methoxypolyethylene glycol (meth)acrylate, cyclohexyl(meth)acrylate, isobornyl(meth)acrylate, and N,N-dimethylaminopropyl(meth)acrylate; (meth)acrylic acid alkylamide compounds, e.g., (meth)acrylamide, dimethyl(meth)acrylamide, N,N-dimethylethyl(meth)acrylamide, N,N-dimethylpropyl(meth)acrylamide, isopropyl(meth)acrylamide, diethyl(meth)acrylamide, and (meth)acryloyl morpholine; and nitrogen-containing vinyl compounds, e.g., N-vinyl acetamide, N-vinyl formamide, N-vinyl pyridine, N-vinyl pyrrolidone, and N-vinyl carbazole.

Method for Synthesizing Triblock Polymer

Any synthesis method generally used in the related art may be used as the method for synthesizing the triblock polymer used for the ink according to aspects of the present invention insofar as the triblock polymer has the above-described structure. Specific examples thereof include methods in the related art, e.g., a living radical polymerization method and a living anion polymerization method. In the case where a block structure derived from an acidic monomer is introduced into a molecular chain of the triblock polymer, a polymerization method by using an acidic monomer and a method in which polymerization is effected by using an alkyl ester monomer of an acidic monomer and, thereafter, an alkyl ester group is hydrolyzed are mentioned.

Method for Analyzing Triblock Polymer

The composition and the molecular weight of the obtained triblock polymer can be analyzed by a method in the related art. Furthermore, it is also possible to analyze on the basis of an ink containing the triblock polymer by subjecting the ink to centrifugal separation and examining the resulting sediments and a supernatant fluid. Although it is possible to analyze in the state of ink, higher accuracy is ensured through separation of the triblock polymer. As for a specific method, the ink is subjected to centrifugal separation at 75,000 rpm, and the triblock polymer is extracted from the resulting supernatant fluid. The separated triblock polymer is analyzed by using a high-temperature gas chromatography/mass spectrometer (high-temperature GC/MS) and, thereby, the types of units constituting the triblock polymer can be identified. The separated triblock polymer is analyzed quantitatively by using a nuclear magnetic resonance method ($^{13}$C-NMR) and a Fourier transform infrared spectrophotometer (FT-IR) and, thereby, the molecular weights, the types, and the contents of these compounds can be determined. The acid value of the triblock polymer can be measured by a titration method. In examples described later, the polymer is dissolved into tetrahydrofuran (THF) and the acid value can be measured through potentiometric titration by using Automatic Potentiometric Titrator AT510 (produced by Kyoto Electronics Manufacturing Co., Ltd.) with a potassium hydroxide ethanol titrant. The weight average molecular weight and the number average molecular weight of the triblock polymer are obtained by gel permeation chromatography (GPC). According to aspects of the present invention, the measurement condition of GPC is as described below.

Apparatus: Alliance GPC 2695 (produced by Waters)
Column: four gang column of Shodex KF-806M (produced by SHOWA DENKO K.K.)
Mobile phase: THF (analytical grade)
Flow rate: 1.0 mL/min
Oven temperature: 40.0° C.
Amount of injection of sample solution: 0.1 mL
Detector: RI (refractive index)
Polystyrene standard sample: PS-1 and PS-2 (produced by Polymer Laboratories) (molecular weight: 17 types of 7,500,000, 2,560,000, 841,700, 377,400, 320,000, 210,500, 148,000, 96,000, 59,500, 50,400, 28,500, 20,650, 10,850, 5,460, 2,930, 1,300, and 580)

In the examples described later, the measurement was performed under the above-described condition.

Characteristics of Triblock Polymer

Regarding the ABC triblock polymer used for the ink according to aspects of the present invention, the number average molecular weight (Mn), in terms of polystyrene, obtained by GPC may be 1,000 or more and 30,000 or less, such as 1,000 or more and 10,000 or less, and even 2,000 or more and 10,000 or less. If the number average molecular weight is less than 1,000, the water solubility of the triblock polymer is enhanced and the amounts of water and water-soluble solvent remaining in the obtained image increase. Therefore, an effect of improving the scratch resistance of the image is not obtained sufficiently in some cases. If the number average molecular weight is more than 30,000, the water solubility of the triblock polymer is reduced and, thereby, an effect of improving the ejection stability of the ink is not obtained sufficiently in some cases.

The molecular weight distribution obtained by GPC of the ABC triblock polymer may satisfy 1.0≤(weight average molecular weight in terms of polystyrene: Mw)/(number average molecular weight in terms of polystyrene: Mn)≤2.0. The value of the molecular weight distribution is 1.0 or more in theory. An approach of this value to 1.0 refers to an approach to monodispersion. Meanwhile, if the molecular weight distribution is more than 2.0, an effect of improving the storage stability of the ink is not obtained sufficiently in some cases.

The acid value of the ABC triblock polymer used for the ink according to aspects of the present invention may be 20 mgKOH/g or more and 100 mgKOH/g or less, and even 40 mgKOH/g or more and 80 mgKOH/g or less. If the acid value is less than 20 mgKOH/g, polymer emulsion particles do not exhibit sufficient hydrophilicity, and an effect of improving the ejection stability of the ink is not obtained sufficiently in some cases. If the acid value is more than 100 mgKOH/g, polymer emulsion particles exhibit high hydrophilicity, and the amounts of water and water-soluble solvent remaining in the obtained image increase. Consequently, an effect of improving the scratch resistance of the image is not obtained sufficiently in some cases.

Furthermore, the hydrophilicity of the ABC triblock polymer used for the ink according to aspects of the present invention can be evaluated on the basis of the ratio (Mn/acid value) of the number average molecular weight (Mn), in terms of polystyrene, obtained by GPC of the ABC triblock polymer to the acid value. According to aspects of the present invention, the value of Mn/acid value may be 50 or more and 300 or less. If the value is less than 50, the molecular weight of the ABC triblock polymer is small relative to the acid value, so that the hydrophilicity of the ABC triblock polymer is high, and the amounts of water and water-soluble solvent remaining in the obtained image increase. Consequently, an effect of improving the scratch resistance of the image is not obtained sufficiently in some cases. If the value is more than 300, the hydrophilicity of the triblock polymer is low, so that an effect of improving the ejection stability of the ink is not obtained sufficiently in some cases.

The proportion (percent by mass), relative to a total mass of the ABC triblock polymer, of the A block in the ABC triblock polymer used for the ink according to aspects of the present invention may be 3.5 times or more and 30.0 times or less the proportion (percent by mass) of segments derived from all acidic monomers contained in the polymer. If the proportion is less than 3.5 times, the hydrophilicity of the ABC triblock polymer is high and the amounts of water and water-soluble solvent remaining in the obtained image increase and, thereby, an effect of improving the scratch resistance of the image is not obtained sufficiently in some cases. If the proportion is more than 30.0 times, the ratio of the A block to control the affinity for the polymer emulsion to the C block increases and, thereby, the polymer emulsion does not exhibit sufficient hydrophilicity, so that an effect of improving the ejection stability of the ink is not obtained sufficiently in some cases. The content (percent by mass) of the ABC triblock polymer in the ink may be 0.1 percent by mass or more and 15.0 percent by mass or less relative to a total mass of the ink.

Polymer Emulsion

In the present invention, the "polymer emulsion" refers to polymer fine particles present in a state of being dispersed in water. Specific examples include acrylic emulsions synthesized through emulsion polymerization or the like of monomers, e.g., a (meth)acrylic acid alkyl ester and (meth)acrylic acid alkyl amides; styrene-acryl emulsions synthesized through emulsion polymerization or the like of (meth)acrylic acid alkyl esters, (meth)acrylic acid alkyl amides, or the like and a styrene monomer; polyethylene emulsions, polypropylene emulsions, polyurethane emulsions, and styrene-butadiene emulsions. Furthermore, core-shell type polymer emulsions in which compositions of polymers are different between a core portion and a shell portion constituting the polymer emulsion, emulsions produced by emulsion polymerization around seed particles, which are acrylic fine particles synthesized in advance in order to control the particle diameter, and the like may be employed. Moreover, hybrid type polymer emulsions produced by chemically bonding different polymer emulsions, such as, an acrylic polymer emulsion and an urethane polymer emulsion, may be employed.

As for the monomer constituting the polymer emulsion, (meth)acrylic acid; (meth)acrylic acid alkyl esters synthesized from alkyl alcohols and (meth)acrylic acid, e.g., methyl (meth)acrylate, n-butyl(meth)acrylate, and 2-ethylhexyl (meth)acrylate; and (meth)acrylic acid alkylamides, e.g., (meth)acrylamide, dimethyl(meth)acrylamide, N,N-dimethylethyl(meth)acrylamide, N,N-dimethylpropyl(meth)acrylamide, isopropyl(meth)acrylamide, diethyl(meth)acrylamide, and (meth)acryloyl morpholine are mentioned. According to aspects of the present invention, the polymer emulsion can be synthesized by using the same type compounds as the unit constituting the A block from the viewpoint of the affinity for the A block.

Regarding the molecular weight of the polymer emulsion used for the ink according to aspects of the present invention, the number average molecular weight (Mn), in terms of polystyrene, obtained by GPC may be 100,000 or more and 3,000,000 or less, and even 300,000 or more and 2,000,000 or less.

The average particle diameter of the polymer emulsion used for the ink according to aspects of the present invention may be 50 nm or more and 250 nm or less. If the average particle diameter is less than 50 nm, the surface area of the polymer emulsion particle per unit volume increases and a cohesive force between particles increases, so that an effect of improving the storage stability is not obtained sufficiently in some cases. If the average particle diameter is more than 250 nm, the sedimentation velocity of the polymer emulsion in the ink increases, so that effects of improving the ejection stability and the storage stability of the ink are not obtained sufficiently in some cases.

The glass transition temperature (Tg) of the polymer emulsion used for the ink according to aspects of the present invention may be 40° C. or higher and 90° C. or lower, and even 50° C. or higher and 80° C. or lower. If Tg is lower than 40° C., the polymer is soft, and an effect of improving the scratch resistance of the obtained image is not obtained sufficiently in some cases. If Tg is higher than 90° C., the minimum film formation temperature of the polymer emulsion increases, so that the polymer applied to the recording medium is not softened easily and the fixability of the image is not sufficient in some cases. From these points of view, the polymer emulsion by using methyl(meth)acrylate, n-butyl (meth)acrylate, or 2-ethylhexyl(meth)acrylate can be used because Tg of the polymer emulsion can become within the range of 40° C. or higher and 90° C. or lower.

The content (percent by mass) of the polymer emulsion used for the ink according to aspects of the present invention may be 0.1 percent by mass or more and 10.0 percent by mass or less, and even 2.0 percent by mass or more and 8.0 percent by mass or less relative to a total mass of the ink. If the content is less than 0.1 percent by mass, an effect of improving the scratch resistance of the image is not obtained sufficiently in some cases. If the content is more than 10.0 percent by mass, the viscosity of the ink increases and an effect of improving the ejection stability of the ink is not obtained sufficiently in some cases.

The content (percent by mass) relative to a total mass of the ink of the polymer emulsion used for the ink according to aspects of the present invention may be 1.0 time or more and 10.0 times or less the content (percent by mass) relative to the total mass of the ink of the ABC triblock polymer used for the ink according to aspects of the present invention. If the ratio is less than 1.0 time, an effect of improving the scratch resistance of the image is not obtained sufficiently in some cases. If the ratio is more than 10.0 times, the content of the ABC triblock polymer to disperse the polymer emulsion stably is reduced relatively, so that effects of improving the storage stability and the ejection stability of the ink are not obtained sufficiently in some cases.

Coloring Material

The ink according to aspects of the present invention may further contain a coloring material. As for the coloring material used, pigments and dyes are mentioned. Any pigment or dye in the related art can be used. The content of the coloring material may be 0.1 percent by mass or more and 20.0 percent by mass or less, and even 1.0 percent by mass or more and 12.0 percent by mass or less. In particular, the pigment is used as the coloring material from the viewpoint of the weatherability. In the case where the pigment is used as the coloring material, examples of pigments include polymer dispersion type pigments by using polymers as dispersing agents (a polymer-dispersing pigment by using a macromolecular dispersing agent, a microcapsule pigment in which the surfaces of pigment particles are covered with a polymer, and a polymer-attached self-dispersing pigment in which an organic group containing a high molecule is chemically attached to the surfaces of pigment particles) and self dispersion type pigments in which a hydrophilic group is introduced on the surfaces of pigment particles (a self-dispersing pigment). As a matter of course, pigments prepared by different dispersing methods can be used in combination. As for the pigment, specifically, carbon black and organic pigments can be used. The pigments may be used alone or in combination.

In the case where the ink according to aspects of the present invention contains the coloring material, the content (percent by mass) relative to a total mass of the ink of the coloring material may be 0.1 times or more and 1.0 time or less the content (percent by mass) relative to the total mass of the ink of the polymer emulsion used for the ink according to aspects of the present invention. If the ratio is less than 0.1 times, the content of the polymer emulsion in the ink increases and the viscosity of the ink increases, so that effects of improving the storage stability and the ejection stability of the ink are not obtained sufficiently in some cases. If the ratio is more than 1.0 time, the amount of polymer emulsion relative to the coloring material is reduced, so that an effect of improving the scratch resistance of the image is not obtained sufficiently in some cases.

Aqueous Medium

The ink according to aspects of the present invention contains an aqueous medium which is a mixed solvent of water and a water-soluble organic solvent. As for the water, ion-exchanged water (deionized water) can be used. Examples of water-soluble organic solvents include alkyl alcohols having the carbon number of 1 to 4, amides, polyalkylene glycols, glycols, alkylene glycols in which an alkylene group has the carbon number of 2 to 6, polyhydric alcohols, alkyl ethers of polyhydric alcohols, and nitrogen-containing compounds. These water-soluble organic solvents may be used alone or in combination. The content (percent by mass) of the water in the ink may be 10.0 percent by mass or more and 90.0 percent by mass or less, such as 30.0 percent by mass or more and 80.0 percent by mass or less relative to a total mass of the ink. The content (percent by mass) of the water-soluble organic solvent in the ink may be 3.0 percent by mass or more and 50.0 percent by mass or less, and even 3.0 percent by mass or more and 40.0 percent by mass or less relative to a total mass of the ink.

Other Components

The ink according to aspects of the present invention may contain various additives, e.g., a surfactant, a pH regulator, a rust inhibitor, an antiseptic, a fungicide, an antioxidant, a reduction inhibitor, a vaporization promoter, a chelating agent, and other polymers, besides the above-described components, as necessary. The content (percent by mass) of such additives in the ink may be 0.05 percent by mass or more and 10.0 percent by mass or less, and even 0.2 percent by mass or more and 5.0 percent by mass or less relative to a total mass of the ink.

The ink according to aspects of the present invention can further contain fluorine based or silicone based surfactants. Even a small content of fluorine based or silicone based surfactant can reduce a surface tension of the ink and, therefore, the wettability of the recording medium with the ink can be enhanced. Consequently, in the case where recording is performed on a nonpermeable recording medium, a phenomenon in which the ink is repelled from the recording medium is suppressed, and the image quality can be further improved. Examples of fluorine based and silicone based surfactants include Zonyl FSO, Zonyl FSO100, Zonyl FSN, and Zonyl FSN100 (up to this point, produced by Dupont), MEGAFAC F-410, MEGAFAC F-493, MEGAFAC F-443, MEGAFAC F-444, and MEGAFAC F-445 (up to this point, produced by DIC), Novec FC-4430 and Novec FC-4432 (up to this point, produced by 3M), FTERGENT 100, FTERGENT 150, FTERGENT 150CH, FTERGENT 250, FTERGENT 400SW, and FTERGENT 501 (up to this point, produced by Neos Co., Ltd.), KS508, KP360A, and KP360A (up to this point, produced by Shin-Etsu Chemical Co., Ltd.), FZ-2191, FZ-2123, and 8211ADDITIVE (up to this point, produced by Dow Corning Toray Silicone Co., Ltd.).

The pH of the ink according to aspects of the present invention may be specified to be 7.0 or more and 10.0 or less. If the pH of the ink is in an acidic region (pH less than 7.0), anionic groups (for example, carboxylate ion group) in the ABC triblock polymer receive protons and, thereby, a large number of electrically neutralized functional groups (for example, carboxyl group) are present. Consequently, a repulsion between the ABC triblock polymers is reduced, and an effect of improving the dispersion stability of polymer emulsion particles is not obtained sufficiently in some cases. On the other hand, if the pH of the ink is too high, corrosion of members and the like constituting the ink jet recording apparatus may occur. Therefore, the pH of the ink may be specified to be 10.0 or less. Examples of pH regulators include organic amines, e.g., diethanolamine and triethanolamine; alkali metal hydroxides, e.g., sodium hydroxide, lithium hydroxide, and potassium hydroxide; organic acids, and inorganic acids. The pH of the ink is a value at 25° C. and may be measured by using a common pH meter.

Ink Cartridge

The ink cartridge according to aspects of the present invention includes an ink storage portion to store an ink, wherein the above-described ink according to aspects of the present invention is stored in the above-described ink storage portion. As for the structure of the ink cartridge, a structure in which the ink storage portion is formed from an ink containing chamber to store the liquid ink and a negative pressure generation member-holding chamber to store a negative pressure generating member to hold the ink in the inside thereof through the use of a negative pressure is mentioned. Alternatively, the ink cartridge may be an ink storage portion which does not have the ink containing chamber to store the liquid ink, but which is configured to hold the whole amount of ink to be stored by the negative pressure generating member. Furthermore, a form in which the ink cartridge is configured to have the ink storage portion and a recording head may be employed.

Ink Jet Recording Method

An ink jet recording method according to aspects of the present invention is the ink jet recording method including the step of ejecting an ink from an ink jet method recording head to record an image on a recording medium, wherein the above-described ink according to aspects of the present invention is used in the above-described image forming step. Regarding aspects of the present invention, in particular, the ink jet recoding method employing the system in which thermal energy is applied to the ink so as to eject the ink from the ejection orifice of the recording head can be used. According to aspects of the present invention, the term "recording" includes the form in which recording is performed on a recording medium, e.g., a recording medium having an ink receiving layer or normal paper, by using the ink according to aspects of the present invention, and a form in which printing is performed on a nonpermeable recording medium, e.g., glass, plastic, and film, by using the ink according to aspects of the present invention. In particular, the ink according to aspects of the present invention can be used with respect to the nonpermeable recording medium because effects according to aspects of the present invention are obtained remarkably.

In aspects of the present invention, a step to heat the recording medium can be included. This is because vaporization of an aqueous medium is facilitated by the heating step, and the aqueous medium is prevented from remaining in the obtained image, so that the scratch resistance of the image is improved. The step to heat the recording medium may be performed before or after the above-described image forming step, but the step to heat the recording medium can be included before application of the ink to the recording medium. This is because vaporization of the aqueous medium occurs at the instance when the ink is applied to the recording medium, flowing of the coloring material between adjacent ink droplets is prevented, and, thereby, the image quality of the obtained image is more improved. The term "to heat the recording medium before application of the ink to the recording medium" refers to the fact that ink droplets are applied to the heated recording medium and includes the case where recording is performed while the recording medium is heated insofar as the above-described condition is satisfied. Specific examples include a method wherein a platen is formed from an aluminum alloy which is produced by a die casting method and which is not easily thermally deformed, a nickel alloy heater is disposed at the lower portion of the platen, and perform recording while the recording medium is heated by heating the platen. Alternatively, a heating step may be further included after application of the ink to the recording medium in addition to the step to heat the recording medium before application of the ink to the recording medium. In the case where the heating step is further included after application of the ink to the recording medium, drying of ink droplets applied to the recording medium and film formation of the polymer emulsion are further facilitated and the fixability of the ink to the recording medium can be more improved. In this regard, in the case where a nonpermeable recording medium is used, heating is performed at a temperature lower than the softening temperature of the recording medium in every heating step.

Examples

The present invention will be described below in further detail with reference to examples and comparative examples. However, the present invention is not limited to the following examples within the bounds of not departing from the gist thereof. By the way, in the following description of the examples, the term "part" is on a mass basis, unless otherwise specified. Abbreviations are as described below.

AA: acrylic acid
MAA: methacrylic acid
MMA: methyl methacrylate
2EHA: 2-ethylhexyl acrylate
nBA: n-butyl acrylate
nBMA: n-butyl methacrylate
tBMA: tert-butyl methacrylate
HEMA: 2-hydroxyethyl methacrylate
iPMA: isopropyl methacrylate
nNMA: n-nonyl methacrylate
BzMA: 2-benzyl methacrylate
ETEGMA: ethoxytriethylene glycol methacrylate Preparation of Polymer Aqueous Solution Preparation of Polymer Aqueous Solutions 1 to 71 and 77 to 81

Polymer aqueous solutions 1 to 71 and 77 to 81 were prepared by using the following Polymerization method I or Polymerization method II with charges described in Table 1 and Table 2.

Polymerization Method I

In a nitrogen atmosphere at a polymerization temperature T (° C.), 1.73 g of n-butyl lithium solution was added to 160 g of tetrahydrofuran (THF) including 0.47 g of lithium. Subsequently, Monomer x was added and agitation was performed for 40 minutes. Thereafter, 3.08 g of diethyl zinc solution was added and agitation was performed for 1 minute to obtain a polymerization solution of Monomer x. Monomer y solution prepared by adding Monomer y to 11 g of THF and adding 4.53 g of diethyl zinc solution in four batches was dropped on the polymerization solution of Monomer x over 6 minutes. After dropping was finished, agitation was performed for 60 minutes to obtain an XY diblock polymer aqueous solution. Furthermore, Monomer z solution prepared by adding Monomer z to 11 g of THF and adding 4.53 g of diethyl zinc solution in four batches was dropped on the XY diblock polymer aqueous solution over 6 minutes. After dropping was finished, agitation was performed for 60 minutes, and 1.3 g of acetic acid was added to terminate the reaction. A XYZ triblock polymer was obtained by adding 2.8 g of 35.0% hydrochloric acid aqueous solution to the resulting solution, performing agitation at room temperature for 10 minutes, and performing washing three times with pure water, followed by drying.

The number average molecular weight of the resulting XYZ triblock polymer was measured with GPC under the above-described condition. Regarding each polymer, it was ascertained that tBMA was hydrolyzed because a peak was present at a chemical shift value δ: 12 to 13 of a carboxyl group of MAA on the basis of proton nuclear magnetic resonance ($^1$H-NMR) spectroscopy. In addition, constituent ratios of monomers constituting each block were analyzed on the basis of the $^1$H-NMR measurement. As for the acid value, the XYZ triblock polymer was dissolved into THF, and the acid value was measured with Automatic Potentiometric Titrator AT510 (produced by Kyoto Electronics Manufacturing Co., Ltd.) by using a 0.5 mol/L KOH ethanol solution as a titrant. The resulting XYZ triblock polymer was dissolved into THF, a potassium hydroxide aqueous solution was added in such a way that the degree of neutralization of anionic groups of the polymer became 80% on a mole basis, an appropriate amount of water was further added, and agitation was performed. Thereafter, THF was removed under the condition of reduced pressure, and water was added, so as to obtain 25.0 percent by mass polymer aqueous solution.

Polymerization Method II

In a glove box subjected to nitrogen substitution, Monomer x and 24.8 mg of ethyl-2-methyl-2-methyltellanyl-propionate were reacted at a polymerization temperature T (° C.) for 30 hours. After the reaction was finished, Monomer y was added successively, and a reaction was effected at a polymerization temperature T (° C.) for 30 hours. After the reaction was finished, Monomer z was added, and a reaction was effected at a polymerization temperature T (° C.) for 30 hours. After the reaction was finished, the reaction solution was dissolved into 5 mL of chloroform, and the resulting solution was poured into agitated 300 mL of water/methanol mixed solution (water:methanol=1:4). A precipitated polymer was suction-filtrated and dried, so as to obtain an XYZ triblock polymer.

The molecular weight of the resulting XYZ triblock polymer was measured with GPC under the above-described condition. In addition, constituent ratios of monomers constituting each block were analyzed on the basis of the $^1$H-NMR spectroscopy. As for the acid value, the XYZ triblock polymer was dissolved into THF, and the acid value was measured with Automatic Potentiometric Titrator AT510 (produced by Kyoto Electronics Manufacturing Co., Ltd.) by using a 0.5 mol/L potassium hydroxide ethanol solution as a titrant. A potassium hydroxide aqueous solution was added to the resulting polymer solution in such a way that the degree of neutralization of anionic groups of the polymer became 80% on a mole basis, an appropriate amount of water was further added, and agitation was performed. Thereafter, the polymerization solvent was removed under the condition of reduced pressure, and water was added, so as to produce 25.0 percent by mass polymer aqueous solution.

TABLE 1

Preparation condition of polymer aqueous solution

| Polymer aqueous solution No. | Polymerization method | Polymerization temperature T (° C.) | Monomer x Type | Usage (g) | (part) | Monomer y Type | Usage (g) | (part) | Type | Usage (g) | (part) | Monomer z Type | Usage (g) | (part) |
|---|---|---|---|---|---|---|---|---|---|---|---|---|---|---|
| 1 | I | −50 | MMA | 4.520 | 64.9 | nBMA | 1.160 | 16.7 | tBMA | 0.850 | 12.2 | tBMA | 0.430 | 6.2 |
| 2 | II | 60 | MMA | 2.510 | 81.0 | nBA | 0.093 | 3.0 | HEMA | 0.419 | 13.5 | AA | 0.078 | 2.5 |
| 3 | | 60 | | 2.510 | 81.0 | | 0.093 | 3.0 | | 0.415 | 13.4 | | 0.081 | 2.6 |
| 4 | | 60 | | 2.510 | 81.0 | | 0.093 | 3.0 | | 0.338 | 10.9 | | 0.158 | 5.1 |
| 5 | | 60 | | 2.510 | 81.0 | | 0.093 | 3.0 | | 0.217 | 7.0 | | 0.279 | 9.0 |
| 6 | | 60 | | 2.510 | 81.0 | | 0.093 | 3.0 | | 0.099 | 3.2 | | 0.397 | 12.8 |
| 7 | | 60 | | 2.510 | 81.0 | | 0.093 | 3.0 | | 0.093 | 3.0 | | 0.403 | 13.0 |
| 8 | I | 10 | MMA | 0.620 | 35.2 | HEMA | 0.720 | 40.9 | — | 0 | 0 | tBMA | 0.420 | 23.9 |
| 9 | | 10 | | 0.640 | 36.4 | | 0.700 | 39.8 | — | 0 | 0 | | 0.420 | 23.9 |
| 10 | | 10 | | 0.960 | 54.5 | | 0.380 | 21.6 | — | 0 | 0 | | 0.420 | 23.9 |
| 11 | | 10 | | 1.280 | 72.6 | | 0.064 | 3.6 | — | 0 | 0 | | 0.420 | 23.8 |
| 12 | | 10 | | 1.300 | 73.6 | | 0.047 | 2.7 | — | 0 | 0 | | 0.420 | 23.8 |
| 13 | II | 10 | 2EHA | 0.080 | 81.0 | nBA | 0.005 | 5.0 | — | 0 | 0 | AA | 0.014 | 14.0 |
| 14 | | 10 | | 0.081 | 81.0 | | 0.005 | 5.0 | — | 0 | 0 | | 0.014 | 14.0 |
| 15 | | 10 | | 0.324 | 81.0 | | 0.020 | 5.0 | — | 0 | 0 | | 0.056 | 14.0 |
| 16 | | 10 | | 0.810 | 81.0 | | 0.050 | 5.0 | — | 0 | 0 | | 0.140 | 14.0 |
| 17 | | 10 | | 2.430 | 81.0 | | 0.150 | 5.0 | — | 0 | 0 | | 0.420 | 14.0 |
| 18 | | 10 | | 2.440 | 81.0 | | 0.151 | 5.0 | — | 0 | 0 | | 0.421 | 14.0 |
| 19 | II | −60 | MMA | 2.511 | 81.0 | nBMA | 0.186 | 6.0 | AA | 0.217 | 7.0 | AA | 0.186 | 6.0 |
| 20 | | −50 | | 2.511 | 81.0 | | 0.186 | 6.0 | | 0.217 | 7.0 | | 0.186 | 6.0 |
| 21 | | −35 | | 2.511 | 81.0 | | 0.186 | 6.0 | | 0.217 | 7.0 | | 0.186 | 6.0 |
| 22 | | −20 | | 2.511 | 81.0 | | 0.186 | 6.0 | | 0.217 | 7.0 | | 0.186 | 6.0 |
| 23 | | 0 | | 2.511 | 81.0 | | 0.186 | 6.0 | | 0.217 | 7.0 | | 0.186 | 6.0 |
| 24 | | 10 | | 2.511 | 81.0 | | 0.186 | 6.0 | | 0.217 | 7.0 | | 0.186 | 6.0 |
| 25 | II | 10 | 2EHA | 1.290 | 39.0 | nBA | 0.099 | 3.0 | HEMA | 1.540 | 46.5 | AA | 0.380 | 11.5 |
| 26 | | 10 | | 1.290 | 39.0 | | 0.099 | 3.0 | | 1.550 | 46.8 | | 0.370 | 11.2 |
| 27 | | 10 | | 2.670 | 80.9 | | 0.099 | 3.0 | | 0.261 | 7.9 | | 0.270 | 8.2 |
| 28 | | 10 | | 2.670 | 81.1 | | 0.099 | 3.0 | | 0.394 | 12.0 | | 0.130 | 3.9 |
| 29 | | 10 | | 2.670 | 81.0 | | 0.099 | 3.0 | | 0.439 | 13.3 | | 0.089 | 2.7 |
| 30 | | 10 | | 2.670 | 81.0 | | 0.099 | 3.0 | | 0.442 | 13.4 | | 0.086 | 2.6 |
| 31 | II | 10 | 2EHA | 0.083 | 90.0 | nBMA | 0.007 | 7.1 | MAA | 0.0008 | 0.9 | MAA | 0.002 | 2.0 |
| 32 | | 10 | | 0.086 | 90.0 | | 0.007 | 7.1 | | 0.0009 | 0.9 | | 0.002 | 2.0 |
| 33 | | 10 | | 1.170 | 38.9 | | 0.632 | 21.0 | | 0.602 | 20.0 | | 0.602 | 20.0 |

TABLE 1-continued

Preparation condition of polymer aqueous solution

| Polymer aqueous solution No. | Polymerization method | Polymerization temperature T (° C.) | Monomer x Type | Usage (g) | (part) | Monomer y Type | Usage (g) | (part) | Type | Usage (g) | (part) | Monomer z Type | Usage (g) | (part) |
|---|---|---|---|---|---|---|---|---|---|---|---|---|---|---|
| 34 | | 10 | | 1.170 | 39.0 | | 1.140 | 38.0 | | 0.391 | 13.0 | | 0.301 | 10.0 |
| 35 | | 10 | | 1.220 | 39.1 | | 1.400 | 44.9 | | 0.250 | 8.0 | | 0.250 | 8.0 |
| 36 | | 10 | | 1.250 | 39.0 | | 1.440 | 45.0 | | 0.256 | 8.0 | | 0.256 | 8.0 |

TABLE 2

Preparation condition of polymer aqueous solution

| Polymer aqueous solution No. | Polymerization method | Polymerization temperature T (° C.) | Monomer x Type | Usage (g) | (part) | Type | Usage (g) | (part) | Monomer y Type | Usage (g) | (part) |
|---|---|---|---|---|---|---|---|---|---|---|---|
| 37 | I | −50 | MMA | 6.220 | 68.7 | — | 0 | 0 | HEMA | 2.410 | 26.6 |
| 38 | | −50 | | 6.220 | 68.7 | — | 0 | 0 | | 2.400 | 26.5 |
| 39 | | −50 | | 6.220 | 67.0 | — | 0 | 0 | | 2.040 | 22.0 |
| 40 | | −50 | | 6.220 | 64.9 | — | 0 | 0 | | 1.600 | 16.7 |
| 41 | | −50 | | 6.220 | 63.7 | — | 0 | 0 | | 1.310 | 13.4 |
| 42 | | −50 | | 6.220 | 63.6 | — | 0 | 0 | | 1.290 | 13.2 |
| 43 | I | −50 | MMA | 5.040 | 36.6 | — | 0 | 0 | nBMA | 2.580 | 18.8 |
| 44 | | −50 | | 5.170 | 37.6 | — | 0 | 0 | | 2.580 | 18.8 |
| 45 | | −50 | | 7.750 | 56.4 | — | 0 | 0 | | 1.290 | 9.4 |
| 46 | | −50 | | 10.340 | 75.1 | — | 0 | 0 | | 0.650 | 4.7 |
| 47 | | −50 | | 10.470 | 76.0 | — | 0 | 0 | | 0.650 | 4.7 |
| 48 | II | 60 | 2EHA | 0.059 | 59.9 | — | 0 | 0 | HEMA | 0.037 | 37.1 |
| 49 | | 60 | | 0.060 | 60.0 | — | 0 | 0 | | 0.037 | 37.0 |
| 50 | | 60 | | 0.240 | 60.0 | — | 0 | 0 | | 0.120 | 30.0 |
| 51 | | 60 | | 0.600 | 60.0 | — | 0 | 0 | | 0.300 | 30.0 |
| 52 | | 60 | | 1.800 | 60.0 | — | 0 | 0 | | 0.738 | 24.6 |
| 53 | | 60 | | 1.802 | 60.0 | — | 0 | 0 | | 0.739 | 24.6 |
| 54 | II | −60 | nBMA | 0.390 | 65.9 | — | 0 | 0 | 2EHA | 0.130 | 22.0 |
| 55 | | −50 | | 0.390 | 65.9 | — | 0 | 0 | | 0.130 | 22.0 |
| 56 | | −35 | | 0.390 | 65.9 | — | 0 | 0 | | 0.130 | 22.0 |
| 57 | | −20 | | 0.390 | 65.9 | — | 0 | 0 | | 0.130 | 22.0 |
| 58 | | 0 | | 0.390 | 65.9 | — | 0 | 0 | | 0.130 | 22.0 |
| 59 | | 10 | | 0.390 | 65.9 | — | 0 | 0 | | 0.130 | 22.0 |
| 60 | I | −50 | nBMA | 3.640 | 38.0 | — | 0 | 0 | HEMA | 4.180 | 43.6 |
| 61 | | −50 | | 3.730 | 38.9 | — | 0 | 0 | | 4.090 | 42.7 |
| 62 | | −50 | | 7.110 | 76.0 | — | 0 | 0 | | 1.070 | 11.4 |
| 63 | | −50 | | 7.110 | 78.0 | — | 0 | 0 | | 1.420 | 15.6 |
| 64 | | −50 | | 8.000 | 88.3 | — | 0 | 0 | | 0.620 | 6.8 |
| 65 | | −50 | | 8.260 | 91.2 | — | 0 | 0 | | 0.360 | 4.0 |
| 66 | II | −50 | MMA | 0.128 | 40.0 | 2EHA | 0.064 | 20.0 | HEMA | 0.096 | 30.0 |
| 67 | | −50 | | 0.13 | 39.0 | | 0.065 | 20.0 | | 0.098 | 30.0 |
| 68 | | −50 | | 0.24 | 40.0 | | 0.12 | 20.0 | | 0.180 | 30.0 |
| 69 | | −50 | | 0.48 | 40.0 | | 0.24 | 20.0 | | 0.360 | 30.0 |
| 70 | | −50 | | 0.78 | 40.0 | | 0.39 | 20.0 | | 0.585 | 30.0 |
| 71 | | −50 | | 0.788 | 40.0 | | 0.394 | 20.0 | | 0.591 | 30.0 |
| 77 | I | −50 | nBMA | 4.52 | 64.9 | — | 0 | 0 | tBMA | 1.280 | 18.4 |
| 78 | | −50 | nBMA | 4.52 | 64.9 | — | 0 | 0 | MMA | 1.160 | 16.7 |
| 79 | I | −50 | nNMA | 4.52 | 64.9 | — | 0 | 0 | nBMA | 1.160 | 16.7 |
| 80 | | −50 | MMA | 4.52 | 64.9 | — | 0 | 0 | iPMA | 1.160 | 16.7 |
| 81 | | −50 | MMA | 4.52 | 64.9 | — | 0 | 0 | nNMA | 1.160 | 16.7 |

| Polymer aqueous solution No. | Monomer y Type | Usage (g) | (part) | Monomer z Type | Usage (g) | (part) |
|---|---|---|---|---|---|---|
| 37 | — | 0 | 0 | tBMA | 0.430 | 4.7 |
| 38 | — | 0 | 0 | | 0.440 | 4.9 |
| 39 | — | 0 | 0 | | 1.030 | 11.1 |
| 40 | — | 0 | 0 | | 1.760 | 18.4 |
| 41 | — | 0 | 0 | | 2.240 | 22.9 |
| 42 | — | 0 | 0 | | 2.270 | 23.2 |
| 43 | HEMA | 4.010 | 29.1 | tBMA | 2.130 | 15.5 |
| 44 | | 3.880 | 28.2 | | 2.130 | 15.5 |

TABLE 2-continued

Preparation condition of polymer aqueous solution

| | | | | | | |
|---|---|---|---|---|---|---|
| 45 | | 2.580 | 18.8 | | 2.130 | 15.5 |
| 46 | | 0.650 | 4.7 | | 2.130 | 15.5 |
| 47 | | 0.520 | 3.8 | | 2.130 | 15.5 |
| 48 | — | 0 | 0 | MAA | 0.003 | 3.0 |
| 49 | — | 0 | 0 | | 0.003 | 3.0 |
| 50 | — | 0 | 0 | | 0.040 | 10.0 |
| 51 | — | 0 | 0 | | 0.100 | 10.0 |
| 52 | — | 0 | 0 | | 0.462 | 15.4 |
| 53 | — | 0 | 0 | | 0.463 | 15.4 |
| 54 | MAA | 0.036 | 6.1 | MAA | 0.036 | 6.1 |
| 55 | | 0.036 | 6.1 | | 0.036 | 6.1 |
| 56 | | 0.036 | 6.1 | | 0.036 | 6.1 |
| 57 | | 0.036 | 6.1 | | 0.036 | 6.1 |
| 58 | | 0.036 | 6.1 | | 0.036 | 6.1 |
| 59 | | 0.036 | 6.1 | | 0.036 | 6.1 |
| 60 | — | 0 | 0 | tBMA | 1.760 | 18.4 |
| 61 | — | 0 | 0 | | 1.760 | 18.4 |
| 62 | — | 0 | 0 | | 1.170 | 12.5 |
| 63 | — | 0 | 0 | | 0.590 | 6.5 |
| 64 | — | 0 | 0 | | 0.440 | 4.9 |
| 65 | — | 0 | 0 | | 0.440 | 4.9 |
| 66 | — | 0 | 0 | MAA | 0.032 | 10.0 |
| 67 | — | 0 | 0 | | 0.033 | 10.0 |
| 68 | — | 0 | 0 | | 0.060 | 10.0 |
| 69 | — | 0 | 0 | | 0.120 | 10.0 |
| 70 | — | 0 | 0 | | 0.195 | 10.0 |
| 71 | — | 0 | 0 | | 0.197 | 10.0 |
| 77 | — | 0 | 0 | MMA | 1.160 | 16.7 |
| 78 | — | 0 | 0 | tBMA | 1.280 | 18.4 |
| 79 | — | 0 | 0 | tBMA | 1.280 | 18.4 |
| 80 | — | 0 | 0 | tBMA | 1.280 | 18.4 |
| 81 | — | 0 | 0 | tBMA | 1.280 | 18.4 |

Preparation of Polymer Aqueous Solution 72

In a nitrogen atmosphere at −50° C., 1.73 g of n-butyl lithium solution was added to 160 g of THF including 0.47 g of lithium. Subsequently, 4.52 g of MMA, 1.16 g of nBMA, and 1.28 g of tBMA were added and agitation was performed for 40 minutes. Thereafter, 3.08 g of diethyl zinc solution was added and agitation was performed for 1 minute. Furthermore, 1.3 g of acetic acid was added to terminate the reaction. A random polymer was obtained by adding 2.8 g of 35.0% hydrochloric acid aqueous solution to the resulting solution, performing agitation at room temperature for 10 minutes, and performing washing three times with pure water, followed by drying.

The number average molecular weight of the resulting random polymer was measured with GPC under the above-described condition. It was ascertained that tBMA was hydrolyzed because a peak was present at a chemical shift value δ: 12 to 13 of a carboxyl group of MAA on the basis of the $^1$H-NMR spectroscopy. In addition, constituent ratios of monomers were analyzed on the basis of the $^1$H-NMR measurement. As for the acid value, the random polymer was dissolved into THF, and the acid value was measured with Automatic Potentiometric Titrator AT510 (produced by Kyoto Electronics Manufacturing Co., Ltd.) by using a 0.5 mol/L potassium hydroxide ethanol solution as a titrant. The resulting random polymer was dissolved into THF, a potassium hydroxide aqueous solution was added in such a way that the degree of neutralization of anionic groups of the polymer became 80% on a mole basis, an appropriate amount of water was further added, and agitation was performed. Thereafter, THF was removed under the condition of reduced pressure, and water was added, so as to obtain 25.0 percent by mass Polymer aqueous solution 72.

Preparation of Polymer Aqueous Solutions 73 to 76

Polymer aqueous solutions 73 to 76 were prepared by using the following polymerization method with charges described in Table 3. In a nitrogen atmosphere at −50° C., 1.73 g of n-butyl lithium solution was added to 160 g of THF including 0.47 g of lithium. Subsequently, Monomer x was added and agitation was performed for 40 minutes. Thereafter, 3.08 g of diethyl zinc solution was added and agitation was performed for 1 minute to obtain a polymerization solution of Monomer x. Monomer y solution prepared by adding Monomer y to 11 g of THF and adding 4.53 g of diethyl zinc solution in four batches was dropped on the polymerization solution of Monomer x over 6 minutes. After dropping was finished, agitation was performed for 60 minutes and, furthermore, 1.3 g of acetic acid was added to terminate the reaction. An XY diblock polymer was obtained by adding 2.8 g of 35.0% hydrochloric acid aqueous solution to the resulting solution, performing agitation at room temperature for 10 minutes, and performing washing three times with pure water, followed by drying.

The number average molecular weight of the resulting XY diblock polymer was measured with GPC under the above-described condition. Regarding each polymer, it was ascertained that tBMA was hydrolyzed because a peak was present at a chemical shift value δ: 12 to 13 of a carboxyl group of MAA on the basis of the $^1$H-NMR spectroscopy. In addition, constituent ratios of monomers constituting each block were analyzed on the basis of the $^1$H-NMR measurement. As for the acid value, the XY diblock polymer was dissolved into THF, and the acid value was measured with Automatic Potentiometric Titrator AT510 (produced by Kyoto Electronics Manufacturing Co., Ltd.) by using a 0.5 mol/L potassium hydroxide ethanol solution as a titrant. The resulting XY diblock polymer was dissolved into THF, a potassium hydroxide aqueous solution was added in such a way that the degree of neutralization of anionic groups of the polymer became 80% on a mole basis, an appropriate amount of water was further added, and agitation was performed. Thereafter, THF was removed under the condition of reduced pressure, and water was added, so as to obtain 25.0 percent by mass Polymer aqueous solutions 73 to 76.

Preparation of Polymer Aqueous Solution 83

The inside of a glass container provided with a three-way stopcock was substituted with nitrogen, and adsorbed water was removed by heating to 250° C. in a nitrogen gas atmosphere. After the system was returned to room temperature, isobutyl vinyl ether ($CH_2$=$CHOCH_2CH(CH_3)_2$) (hereafter abbreviated as IBVE) was added to 16 mmol of ethyl acetate, 0.05 mmol of 1-isobutoxyethyl acetate, and 11 mL of toluene,

TABLE 3

Preparation condition of polymer aqueous solution

| Polymer aqueous solution No. | Monomer x | | | | | | Monomer y | | | | |
|---|---|---|---|---|---|---|---|---|---|---|---|
| | Type | Usage (g) | Usage (part) | Type | Usage (g) | Usage (part) | Type | Usage (g) | Usage (part) | Type | Usage (g) | Usage (part) |
| 73 | MMA | 6.27 | 95.1 | — | 0 | 0 | — | 0 | 0 | tBMA | 0.32 | 4.9 |
| 74 | MMA | 5.17 | 70.8 | — | 0 | 0 | — | 0 | 0 | tBMA | 2.13 | 29.2 |
| 75 | MMA | 4.52 | 64.9 | — | 0 | 0 | nBMA | 1.16 | 16.7 | tBMA | 1.28 | 18.4 |
| 76 | MMA | 4.52 | 64.9 | nBMA | 1.16 | 16.7 | — | 0 | 0 | tBMA | 1.28 | 18.4 |

Preparation of Polymer Aqueous Solution 82

Dropping of 107 g (121 mL, 0.677 mol) of trimethylsilyl methacrylate on a solution of 9.05 g (10.5 mL, 51.9 mmol) of 1-methoxy-1-trimethylsiloxy-2-methyl-1-propene and 2 mL of tetrabutylammonium biacetate (0.1 M in propylene carbonate) in 150 mL of THF was performed. During dropping, the temperature of the reaction solution increased gradually, and additional 2 mL of tetrabutylammonium biacetate (0.1 M in propylene carbonate) was added. After all monomers were added, the temperature continued increasing to 57° C. When the temperature was lowered to 33° C., 91.6 g (88.6 mL, 0.52 mol) of BzMA purified by being passed through a basic alumina column in an argon atmosphere was added. When equilibrium was reached at a temperature of 39° C., additional 1 mL of tetrabutylammonium biacetate (0.1 M in propylene carbonate) was added. After addition of monomer was finished, the temperature increased to 57° C. When the temperature was lowered to 35° C., 51.2 g (51.2 mL, 0.205 mol) of ETEGMA purified by being passed through a basic alumina column in an argon atmosphere was dropped by using a dropping funnel, and the resulting mixture was agitated for one night. It was ascertained on the basis of $^1$H-NMR spectroscopy that no remaining monomer was present. The resulting solution was refluxed together with 150 mL of 0.03 M methanolic tetrabutylammonium fluoride and 100 mL of THF for 12 hours. Distillation under reduced pressure was performed with a rotary evaporator to remove the solvent, and a remaining polymer was dried in a vacuum oven at 50° C. for 48 hours, so that 186.3 g of MAA-BzMA-ETEGMA triblock polymer was obtained. The resulting triblock polymer was measured by the $^1$H-NMR spectroscopy and it was ascertained that no trimethylsilyl ester group remained. The resulting ABC triblock polymer was dissolved into THF, a potassium hydroxide aqueous solution was added in such a way that the degree of neutralization of anionic groups of the polymer became 80% on a mole basis, an appropriate amount of water was further added, and agitation was performed. Thereafter, THF was removed under the condition of reduced pressure, and water was added, so as to obtain 25.0 percent by mass Polymer aqueous solution 82.

and the reaction system was cooled. When the temperature in the system reached 0° C., 0.2 mmol of ethylaluminum sesquichloride (an equimolar mixture of diethylaluminum chloride and ethylaluminum dichloride) was added and polymerization was effected. The molecular weight was subjected to time-division monitoring by using GPC and, thereby, completion of polymerization of isobutyl vinyl ether was ascertained. Subsequently, 2-(2-methoxyethoxy)-ethyl-vinyl ether ($CH_2$=$CHOCH_2CH_2OCH_2CH_2OCH_3$) (hereafter abbreviated as MEEVE) was added and polymerization was continued. Completion of polymerization of 2-(2-methoxyethoxy)-ethyl-vinyl ether was ascertained through monitoring by using GPC. Thereafter, a toluene solution of a monomer to form a unit structure, in which a carboxylic acid portion in benzoic acid 2-vinyloxyethyl ether ($CH_2$=$CHOCH_2CH_2OPhCOOH$: Ph represents a phenyl group) (hereafter abbreviated as BzAVEE) was esterified, was added, and a polymerization reaction was effected for 20 hours. The polymerization reaction was terminated by adding a 0.3 percent by mass ammonia/methanol aqueous solution into the system. The reaction mixture solution was diluted with dichloromethane and was washed three times with 0.6 mol/L hydrochloric acid aqueous solution and three times with distilled water. The resulting organic phase was concentrated and exsiccated with an evaporator and was vacuum-dried. Dialysis in a methanol solvent by using a cellulose semipermeable membrane was repeated to remove monomeric compounds. Neutralization with 0.1 mol/L hydrochloric acid aqueous solution was performed in an aqueous dispersion, so as to obtain a triblock polymer in which a sodium salt portion in the C segment was converted to free carboxylic acid. The compound was identified by using $^1$H-NMR and GPC. The obtained ABC triblock polymer was dissolved into THF, a potassium hydroxide aqueous solution was added in such a way that the degree of neutralization of anionic groups of the polymer became 80% on a mole basis, an appropriate amount of water was further added, and agitation was performed. Thereafter, THF was removed under the condition of reduced pressure, and water was added, so as to obtain 25.0 percent by mass Polymer aqueous solution 83.

The polymer compositions and the properties of Polymer aqueous solutions 1 to 83 obtained as described above are shown in Table 4 to Table 6.

TABLE 4

Polymer composition and properties of polymer aqueous solution

| Polymer aqueous solution No. | X block Type | X block Composition ratio (percent by mass) | Y block Type | Y block Composition ratio (percent by mass) | Y block Type | Y block Composition ratio (percent by mass) | Z block Type | Z block Composition ratio (percent by mass) | Acid value (mgKOH/g) |
|---|---|---|---|---|---|---|---|---|---|
| 1 | MMA | 70.0 | nBMA | 18.0 | MAA | 8.0 | MAA | 4.0 | 78 |
| 2 | MMA | 81.0 | nBA | 3.0 | HEMA | 13.5 | AA | 2.5 | 19 |
| 3 |  | 81.0 |  | 3.0 |  | 13.4 |  | 2.6 | 20 |
| 4 |  | 81.0 |  | 3.0 |  | 10.9 |  | 5.1 | 40 |
| 5 |  | 81.0 |  | 3.0 |  | 7.0 |  | 9.0 | 70 |
| 6 |  | 81.0 |  | 3.0 |  | 3.2 |  | 12.8 | 100 |
| 7 |  | 81.0 |  | 3.0 |  | 3.0 |  | 13.0 | 101 |
| 8 | MMA | 39.0 | HEMA | 45.0 | — | 0 | MAA | 16.0 | 104 |
| 9 |  | 40.0 |  | 44.0 | — | 0 |  | 16.0 | 104 |
| 10 |  | 60.0 |  | 24.0 | — | 0 |  | 16.0 | 104 |
| 11 |  | 80.0 |  | 4.0 | — | 0 |  | 16.0 | 104 |
| 12 |  | 81.0 |  | 3.0 | — | 0 |  | 16.0 | 104 |
| 13 | 2EHA | 81.0 | nBA | 5.0 | — | 0 | AA | 14.0 | 109 |
| 14 |  | 81.0 |  | 5.0 | — | 0 |  | 14.0 | 109 |
| 15 |  | 81.0 |  | 5.0 | — | 0 |  | 14.0 | 109 |
| 16 |  | 81.0 |  | 5.0 | — | 0 |  | 14.0 | 109 |
| 17 |  | 81.0 |  | 5.0 | — | 0 |  | 14.0 | 109 |
| 18 |  | 81.0 |  | 5.0 | — | 0 |  | 14.0 | 109 |
| 19 | MMA | 81.0 | nBMA | 6.0 | AA | 7.0 | AA | 6.0 | 101 |
| 20 |  | 81.0 |  | 6.0 |  | 7.0 |  | 6.0 | 101 |
| 21 |  | 81.0 |  | 6.0 |  | 7.0 |  | 6.0 | 101 |
| 22 |  | 81.0 |  | 6.0 |  | 7.0 |  | 6.0 | 101 |
| 23 |  | 81.0 |  | 6.0 |  | 7.0 |  | 6.0 | 101 |
| 24 |  | 81.0 |  | 6.0 |  | 7.0 |  | 6.0 | 101 |
| 25 | 2EHA | 39.0 | nBA | 3.0 | HEMA | 46.5 | AA | 11.5 | 89 |
| 26 |  | 39.0 |  | 3.0 |  | 46.9 |  | 11.1 | 87 |
| 27 |  | 81.0 |  | 3.0 |  | 7.9 |  | 8.1 | 63 |
| 28 |  | 81.0 |  | 3.0 |  | 12.0 |  | 4.0 | 32 |
| 29 |  | 81.0 |  | 3.0 |  | 13.3 |  | 2.7 | 21 |
| 30 |  | 81.0 |  | 3.0 |  | 13.4 |  | 2.6 | 20 |
| 31 | 2EHA | 90.0 | nBMA | 7.1 | MAA | 0.9 | MAA | 2.0 | 19 |
| 32 |  | 90.0 |  | 7.1 |  | 0.9 |  | 2.0 | 19 |
| 33 |  | 39.0 |  | 21.0 |  | 20.0 |  | 20.0 | 261 |
| 34 |  | 39.0 |  | 38.0 |  | 13.0 |  | 10.0 | 150 |
| 35 |  | 39.0 |  | 45.0 |  | 8.0 |  | 8.0 | 104 |
| 36 |  | 39.0 |  | 45.0 |  | 8.0 |  | 8.0 | 104 |

| Polymer aqueous solution No. | Proportion of A block in polymer (percent by mass) | Number average molecular weight Mn | Molecular weight distribution Mw/Mn | Proportion of A block/unit derived from acid monomer | Mn/acid value |
|---|---|---|---|---|---|
| 1 | 70.0 | 4000 | 1.2 | 5.8 | 51 |
| 2 | 81.0 | 31000 | 2.1 | 32.4 | 1632 |
| 3 | 81.0 | 31000 | 2.1 | 31.2 | 1550 |
| 4 | 81.0 | 31000 | 2.1 | 15.9 | 775 |
| 5 | 81.0 | 31000 | 2.1 | 9.0 | 443 |
| 6 | 81.0 | 31000 | 2.1 | 6.3 | 310 |
| 7 | 81.0 | 31000 | 2.1 | 6.2 | 307 |
| 8 | 39.0 | 990 | 2.5 | 2.4 | 10 |
| 9 | 40.0 | 990 | 2.5 | 2.5 | 10 |
| 10 | 60.0 | 990 | 2.5 | 3.8 | 10 |
| 11 | 80.0 | 990 | 2.5 | 5.0 | 10 |
| 12 | 81.0 | 990 | 2.5 | 5.1 | 10 |
| 13 | 81.0 | 990 | 2.2 | 5.8 | 9 |
| 14 | 81.0 | 1000 | 2.2 | 5.8 | 9 |
| 15 | 81.0 | 4000 | 2.2 | 5.8 | 37 |
| 16 | 81.0 | 10000 | 2.2 | 5.8 | 92 |
| 17 | 81.0 | 30000 | 2.2 | 5.8 | 275 |
| 18 | 81.0 | 30100 | 2.2 | 5.8 | 276 |
| 19 | 81.0 | 31000 | 1.1 | 6.2 | 307 |
| 20 | 81.0 | 31000 | 1.2 | 6.2 | 307 |
| 21 | 81.0 | 31000 | 1.6 | 6.2 | 307 |
| 22 | 81.0 | 31000 | 1.8 | 6.2 | 307 |
| 23 | 81.0 | 31000 | 2.0 | 6.2 | 307 |
| 24 | 81.0 | 31000 | 2.1 | 6.2 | 307 |

TABLE 4-continued

Polymer composition and properties of polymer aqueous solution

| No. | | | | | |
|---|---|---|---|---|---|
| 25 | 39.0 | 33000 | 2.1 | 3.4 | 371 |
| 26 | 39.0 | 33000 | 2.1 | 3.5 | 379 |
| 27 | 81.0 | 33000 | 2.1 | 10.0 | 524 |
| 28 | 81.0 | 33000 | 2.1 | 20.3 | 1031 |
| 29 | 81.0 | 33000 | 2.1 | 30.0 | 1571 |
| 30 | 81.0 | 33000 | 2.1 | 31.2 | 1650 |
| 31 | 90.0 | 925 | 2.4 | 31.0 | 49 |
| 32 | 90.0 | 950 | 2.3 | 31.0 | 50 |
| 33 | 39.0 | 30100 | 2.1 | 1.0 | 115 |
| 34 | 39.0 | 30100 | 2.1 | 1.7 | 201 |
| 35 | 39.0 | 31200 | 2.1 | 2.4 | 300 |
| 36 | 39.0 | 32000 | 2.1 | 2.4 | 308 |

TABLE 5

Polymer composition and properties of polymer aqueous solution

| Polymer aqueous solution No. | X block Type | Composition ratio (percent by mass) | Type | Composition ratio (percent by mass) | Y block Type | Composition ratio (percent by mass) | Type | Composition ratio (percent by mass) | Z block Type | Composition ratio (percent by mass) |
|---|---|---|---|---|---|---|---|---|---|---|
| 37 | MMA | 70.0 | — | 0 | HEMA | 27.1 | — | 0 | MAA | 2.9 |
| 38 | | 70.0 | — | 0 | | 27.0 | — | 0 | | 3.0 |
| 39 | | 70.0 | — | 0 | | 23.0 | — | 0 | | 7.0 |
| 40 | | 70.0 | — | 0 | | 18.0 | — | 0 | | 12.0 |
| 41 | | 70.0 | — | 0 | | 14.7 | — | 0 | | 15.3 |
| 42 | | 70.0 | — | 0 | | 14.5 | — | 0 | | 15.5 |
| 43 | MMA | 39.0 | — | 0 | nBMA | 20.0 | HEMA | 31.0 | MAA | 10.0 |
| 44 | | 40.0 | — | 0 | | 20.0 | | 30.0 | | 10.0 |
| 45 | | 60.0 | — | 0 | | 10.0 | | 20.0 | | 10.0 |
| 46 | | 80.0 | — | 0 | | 5.0 | | 5.0 | | 10.0 |
| 47 | | 81.0 | — | 0 | | 5.0 | | 4.0 | | 10.0 |
| 48 | 2EHA | 60.0 | — | 0 | HEMA | 37.0 | — | 0 | MAA | 3.0 |
| 49 | | 60.0 | — | 0 | | 37.0 | — | 0 | | 3.0 |
| 50 | | 60.0 | — | 0 | | 30.0 | — | 0 | | 10.0 |
| 51 | | 60.0 | — | 0 | | 30.0 | — | 0 | | 10.0 |
| 52 | | 60.0 | — | 0 | | 24.6 | — | 0 | | 15.4 |
| 53 | | 60.0 | — | 0 | | 24.6 | — | 0 | | 15.4 |
| 54 | nBMA | 65.0 | — | 0 | 2EHA | 23.0 | MAA | 6.0 | MAA | 6.0 |
| 55 | | 65.0 | — | 0 | | 23.0 | | 6.0 | | 6.0 |
| 56 | | 65.0 | — | 0 | | 23.0 | | 6.0 | | 6.0 |
| 57 | | 65.0 | — | 0 | | 23.0 | | 6.0 | | 6.0 |
| 58 | | 65.0 | — | 0 | | 23.0 | | 6.0 | | 6.0 |
| 59 | | 65.0 | — | 0 | | 23.0 | | 6.0 | | 6.0 |
| 60 | nBMA | 41.0 | — | 0 | HEMA | 47.0 | — | 0 | MAA | 12.0 |
| 61 | | 42.0 | — | 0 | | 46.0 | — | 0 | | 12.0 |
| 62 | | 80.0 | — | 0 | | 12.0 | — | 0 | | 8.0 |
| 63 | | 80.0 | — | 0 | | 16.0 | — | 0 | | 4.0 |
| 64 | | 90.0 | — | 0 | | 7.0 | — | 0 | | 3.0 |
| 65 | | 93.0 | — | 0 | | 4.0 | — | 0 | | 3.0 |
| 66 | MMA | 40.0 | 2EHA | 20.0 | HEMA | 30.0 | — | 0 | MAA | 10.0 |
| 67 | | 40.0 | | 20.0 | | 30.0 | — | 0 | | 10.0 |
| 68 | | 40.0 | | 20.0 | | 30.0 | — | 0 | | 10.0 |
| 69 | | 40.0 | | 20.0 | | 30.0 | — | 0 | | 10.0 |
| 70 | | 40.0 | | 20.0 | | 30.0 | — | 0 | | 10.0 |
| 71 | | 40.0 | | 20.0 | | 30.0 | — | 0 | | 10.0 |
| 77 | nBMA | 70.0 | — | 0 | MAA | 12.0 | — | 0 | MMA | 18.0 |
| 78 | nBMA | 70.0 | — | 0 | MMA | 18.0 | — | 0 | MAA | 12.0 |
| 79 | nNMA | 70.0 | — | 0 | nBMA | 18.0 | — | 0 | MAA | 12.0 |
| 80 | MMA | 70.0 | — | 0 | iPMA | 18.0 | — | 0 | MAA | 12.0 |
| 81 | MMA | 70.0 | — | 0 | nNMA | 18.0 | — | 0 | MAA | 12.0 |
| 82 | MAA | 29.0 | — | 0 | BzMA | 45.0 | — | 0 | ETEGMA | 26.0 |
| 83 | IBVE | 54.0 | — | 0 | MEEVE | 30.0 | — | 0 | BzAVEE | 16.0 |

| Polymer aqueous solution No. | Acid value (mgKOH/g) | Proportion of A block in polymer (percent by mass) | Number average molecular weight Mn | Molecular weight distribution Mw/Mn | Proportion of A block/unit derived from acid monomer | Mn/acid value |
|---|---|---|---|---|---|---|
| 37 | 19 | 70.0 | 5500 | 1.2 | 24.1 | 289 |
| 38 | 20 | 70.0 | 5500 | 1.2 | 23.3 | 275 |
| 39 | 46 | 70.0 | 5500 | 1.2 | 10.0 | 120 |

TABLE 5-continued

Polymer composition and properties of polymer aqueous solution

| | | | | | | |
|---|---|---|---|---|---|---|
| 40 | 78 | 70.0 | 5500 | 1.2 | 5.8 | 71 |
| 41 | 100 | 70.0 | 5500 | 1.2 | 4.6 | 55 |
| 42 | 101 | 70.0 | 5500 | 1.2 | 4.5 | 54 |
| 43 | 65 | 39.0 | 8000 | 1.2 | 3.9 | 123 |
| 44 | 65 | 40.0 | 8000 | 1.2 | 4.0 | 123 |
| 45 | 65 | 60.0 | 8000 | 1.2 | 6.0 | 123 |
| 46 | 65 | 80.0 | 8000 | 1.2 | 8.0 | 123 |
| 47 | 65 | 81.0 | 8000 | 1.2 | 8.1 | 123 |
| 48 | 20 | 60.0 | 990 | 1.2 | 20.0 | 50 |
| 49 | 20 | 60.0 | 1000 | 1.2 | 20.0 | 50 |
| 50 | 65 | 60.0 | 4000 | 1.2 | 6.0 | 62 |
| 51 | 65 | 60.0 | 10000 | 1.2 | 6.0 | 154 |
| 52 | 100 | 60.0 | 30000 | 1.2 | 3.9 | 300 |
| 53 | 100 | 60.0 | 30040 | 1.2 | 3.9 | 300 |
| 54 | 78 | 65.0 | 6000 | 1.1 | 5.4 | 77 |
| 55 | 78 | 65.0 | 6000 | 1.2 | 5.4 | 77 |
| 56 | 78 | 65.0 | 6000 | 1.6 | 5.4 | 77 |
| 57 | 78 | 65.0 | 6000 | 1.8 | 5.4 | 77 |
| 58 | 78 | 65.0 | 6000 | 2.0 | 5.4 | 77 |
| 59 | 78 | 65.0 | 6000 | 2.1 | 5.4 | 77 |
| 60 | 78 | 41.0 | 5500 | 1.2 | 3.4 | 71 |
| 61 | 78 | 42.0 | 5500 | 1.2 | 3.5 | 71 |
| 62 | 52 | 80.0 | 5500 | 1.2 | 10.0 | 106 |
| 63 | 26 | 80.0 | 5500 | 1.2 | 20.0 | 212 |
| 64 | 20 | 90.0 | 5500 | 1.2 | 30.0 | 275 |
| 65 | 20 | 93.0 | 5500 | 1.2 | 31.0 | 275 |
| 66 | 65 | 60.0 | 3200 | 1.2 | 6.0 | 49 |
| 67 | 65 | 60.0 | 3260 | 1.2 | 6.0 | 50 |
| 68 | 65 | 60.0 | 6000 | 1.2 | 6.0 | 92 |
| 69 | 65 | 60.0 | 12000 | 1.2 | 6.0 | 185 |
| 70 | 65 | 60.0 | 19500 | 1.2 | 6.0 | 300 |
| 71 | 65 | 60.0 | 19700 | 1.2 | 6.0 | 303 |
| 77 | 78 | 70.0 | 4000 | 1.2 | 5.8 | 51 |
| 78 | 78 | 70.0 | 4000 | 1.2 | 5.8 | 51 |
| 79 | 78 | 70.0 | 4000 | 1.2 | 5.8 | 51 |
| 80 | 78 | 70.0 | 4000 | 1.2 | 5.8 | 51 |
| 81 | 78 | 70.0 | 4000 | 1.2 | 5.8 | 51 |
| 82 | 188 | 29.0 | 4000 | 1.2 | — | 21 |
| 83 | 43 | 54.0 | 19700 | 1.24 | 3.4 | 458 |

TABLE 6

Polymer composition and properties of polymer aqueous solution

| Polymer aqueous solution No. | X block | | | | | | Y block | | | |
|---|---|---|---|---|---|---|---|---|---|---|
| | Type | Composition ratio (percent by mass) | Type | Composition ratio (percent by mass) | Type | Composition ratio (percent by mass) | Type | Composition ratio (percent by mass) | Type | Composition ratio (percent by mass) |
| 72 | MMA | 70.0 | nBMA | 18.0 | MAA | 12.0 | — | 0 | — | 0 |
| 73 | MMA | 97.0 | — | 0 | — | 0 | MAA | 3.0 | — | 0 |
| 74 | MMA | 80.0 | — | 0 | — | 0 | MAA | 20.0 | — | 0 |
| 75 | MMA | 70.0 | — | 0 | — | 0 | nBMA | 18.0 | MAA | 12.0 |
| 76 | MMA | 70.0 | nBMA | 18.0 | — | 0 | MAA | 12.0 | — | 0 |

| Polymer aqueous solution No. | Acid value (mgKOH/g) | Proportion of A block in polymer (percent by mass) | Number average molecular weight Mn | Molecular weight distribution Mw/Mn | Proportion of A block/unit derived from acid monomer | Mn/acid value |
|---|---|---|---|---|---|---|
| 72 | 78 | — | 4000 | 1.2 | — | 51 |
| 73 | 20 | 97.0 | 4000 | 1.2 | 32.3 | 200 |
| 74 | 130 | 80.0 | 4000 | 1.2 | 4.0 | 31 |
| 75 | 78 | 70.0 | 4000 | 1.2 | 5.8 | 51 |
| 76 | 78 | 88.0 | 4000 | 1.2 | 7.3 | 51 |

Preparation of Polymer Emulsion Dispersion

Polymer emulsion dispersions Em. 1 to Em. 4 were prepared by a procedure described below.

Preparation of Polymer Emulsion Dispersion Em. 1

A three-necked flask was provided with a stirring rod, a cooling tube, a dropping syringe, and a nitrogen gas introduction tube, and the three-necked flask was put into a constant temperature bath kept at 50° C. The materials described in the following item "Raw materials put into three-necked flask" were put into the three-necked flask and an emulsion state was brought about by agitation with the stirring rod.

Raw Materials Put into Three-Necked Flask

| Polymerization initiator: potassium persulfate | 0.5 parts |
| --- | --- |
| Emulsifier: LATEMUL PD-104 (produced by Kao Corporation) | 3.0 parts |
| Methyl methacrylate (MMA) | 4.425 parts |
| 2-Ethylhexyl acrylate (2EHA) | 0.5 parts |
| Acrylic acid (AA) | 0.075 parts |
| Ion-exchanged water | 130.0 parts |

Furthermore, the materials described in the following item "Raw materials put into dropping syringe" were put into the dropping syringe, and dropping into the above-described three-necked flask was performed over 3 hours while the temperature of the constant temperature bath was kept at 50° C. carefully, so that a polymer emulsion was synthesized.

Raw Materials Put into Dropping Syringe

| Polymerization initiator: potassium persulfate | 0.5 parts |
| --- | --- |
| Emulsifier: LATEMUL PD-104 (produced by Kao Corporation) | 3.0 parts |
| Methyl methacrylate (MMA) | 88.5 parts |
| 2-Ethylhexyl acrylate (2EHA) | 10.0 parts |
| Acrylic acid (AA) | 1.5 parts |

In order to enhance the stability of the resulting polymer emulsion, a 10% potassium hydroxide aqueous solution and ion-exchanged water were further dropped, and the pH and the polymer content were adjusted as shown in Table 7, so that Polymer emulsion dispersion Em. 1 was produced. Furthermore, the average particle diameter and the number average molecular weight of the resulting polymer emulsion were measured. As for the average particle diameter of the polymer emulsion, the average particle diameter determined from 50% cumulative value of the volume average particle diameter was measured by using Microtrac UPA-EX150 (produced by NIKKISO CO., LTD.). The number average molecular weight of the polymer emulsion was measured by using GPC. The measurement condition was as described below.

Apparatus: Alliance GPC 2695 (produced by Waters)
Column: four gang column of Shodex KF-806M (produced by SHOWA DENKO K.K.)
Mobile phase: THF (analytical grade)
Flow rate: 1.0 mL/min
Oven temperature: 40.0° C.
Amount of injection of sample solution: 0.1 mL
Detector: RI (refractive index)
Polystyrene standard sample: PS-1 and PS-2 (produced by Polymer Laboratories) (molecular weight: 17 types of 7,500,000, 2,560,000, 841,700, 377,400, 320,000, 210,500, 148,000, 96,000, 59,500, 50,400, 28,500, 20,650, 10,850, 5,460, 2,930, 1,300, and 580)

The measurement results and the characteristics of the polymer emulsion are shown in Table 7.

Preparation of Polymer Emulsion Dispersion Em. 2

Polymer emulsion dispersion Em. 2 was obtained in the same manner as Polymer emulsion dispersion Em. 1 except that the "Raw materials put into three-necked flask" and the "Raw materials put into dropping syringe" were changed to those described below.

Raw Materials Put into Three-Necked Flask

| Polymerization initiator: potassium persulfate | 0.5 parts |
| --- | --- |
| Emulsifier: LATEMUL PD-104 (produced by Kao Corporation) | 3.0 parts |
| Methyl methacrylate (MMA) | 4.25 parts |
| n-Butyl acrylate (nBA) | 0.6 parts |
| Acrylic acid (AA) | 0.15 parts |
| Ion-exchanged water | 130.0 parts |

Raw Materials Put into Dropping Syringe

| Polymerization initiator: potassium persulfate | 0.5 parts |
| --- | --- |
| Emulsifier: LATEMUL PD-104 (produced by Kao Corporation) | 3.0 parts |
| Methyl methacrylate (MMA) | 85.0 parts |
| n-Butyl acrylate (nBA) | 12.0 parts |
| Acrylic acid (AA) | 3.0 parts |

The average particle diameter and the number average molecular weight of the resulting polymer emulsion were measured. The measurement results and the characteristics of the polymer emulsion are shown in Table 7.

Preparation of Polymer Emulsion Dispersion Em. 3

Polymer emulsion dispersion Em. 3 was obtained in the same manner as Polymer emulsion dispersion Em. 1 except that the "Raw materials put into three-necked flask" and the "Raw materials put into dropping syringe" were changed to those described below.

Raw Materials Put into Three-Necked Flask

| Polymerization initiator: potassium persulfate | 0.5 parts |
| --- | --- |
| Emulsifier: LATEMUL PD-104 (produced by Kao Corporation) | 3.0 parts |
| Methyl methacrylate (MMA) | 4.25 parts |
| 2-Ethylhexyl acrylate (2EHA) | 0.6 parts |
| Methacrylic acid (MAA) | 0.15 parts |
| Ion-exchanged water | 130.0 parts |

Raw Materials Put into Dropping Syringe

| Polymerization initiator: potassium persulfate | 0.5 parts |
| --- | --- |
| Emulsifier: LATEMUL PD-104 (produced by Kao Corporation) | 3.0 parts |
| Methyl methacrylate (MMA) | 85.0 parts |
| 2-Ethylhexyl acrylate (2EHA) | 12.0 parts |
| Methacrylic acid (MAA) | 3.0 parts |

The average particle diameter and the number average molecular weight of the resulting polymer emulsion were measured. The measurement results and the characteristics of the polymer emulsion are shown in Table 7.

Preparation of Polymer Emulsion Dispersion Em. 4

Polymer emulsion dispersion Em. 4 was obtained in the same manner as Polymer emulsion dispersion Em. 1 except that the "Raw materials put into three-necked flask" and the "Raw materials put into dropping syringe" were changed to those described below.

Raw Materials Put into Three-Necked Flask

| | |
|---|---|
| Polymerization initiator: potassium persulfate | 0.5 parts |
| Emulsifier: LATEMUL PD-104 (produced by Kao Corporation) | 3.0 parts |
| Methyl methacrylate (MMA) | 4.25 parts |
| n-Butyl acrylate (nBA) | 0.6 parts |
| Methacrylic acid (MAA) | 0.15 parts |
| Ion-exchanged water | 130.0 parts |

Raw Materials Put into Dropping Syringe

| | |
|---|---|
| Polymerization initiator: potassium persulfate | 0.5 parts |
| Emulsifier: LATEMUL PD-104 (produced by Kao Corporation) | 3.0 parts |
| Methyl methacrylate (MMA) | 85.0 parts |
| n-Butyl acrylate (nBA) | 12.0 parts |
| Methacrylic acid (MAA) | 3.0 parts |

The average particle diameter and the number average molecular weight of the resulting polymer emulsion were measured. The measurement results and the characteristics of the polymer emulsion are shown in Table 7.

TABLE 7

Preparation condition and characteristics of polymer emulsion dispersion

| Polymer emulsion dispersion | Monomer unit constituting polymer emulsion | | | pH | Polymer content (%) | Average particle diameter (nm) | Number average molecular weight ($\times 10^4$) |
|---|---|---|---|---|---|---|---|
| Em. 1 | MMA | 2EHA | AA | 8.3 | 45.0 | 210 | 50 |
| Em. 2 | MMA | nBA | AA | 8.3 | 45.0 | 220 | 30 |
| Em. 3 | MMA | 2EHA | MAA | 8.3 | 45.0 | 200 | 70 |
| Em. 4 | MMA | nBA | MAA | 8.3 | 45.0 | 250 | 40 |

Preparation of Pigment Dispersion

Preparation of Black Pigment Dispersion K1

Self-dispersing pigment dispersion Cab-O-Jet200 (produced by Cabot) was diluted with water and was agitated sufficiently, so as to obtain Black pigment dispersion K1 (pigment content was 15.0 percent by mass).

Preparation of Cyan Pigment Dispersion C1

Self-dispersing pigment dispersion Cab-O-Jet250C (produced by Cabot) was diluted with water and was agitated sufficiently, so as to obtain Cyan pigment dispersion C1 (pigment content was 10.0 percent by mass).

Preparation of Magenta Pigment Dispersion M1

Self-dispersing pigment dispersion Cab-O-Jet265M (produced by Cabot) was diluted with water and was agitated sufficiently, so as to obtain Magenta pigment dispersion M1 (pigment content was 10.0 percent by mass).

Preparation of Yellow Pigment Dispersion Y1

Self-dispersing pigment dispersion Cab-O-Jet740Y (produced by Cabot) was diluted with water and was agitated sufficiently, so as to obtain Yellow pigment dispersion Y1 (pigment content was 10.0 percent by mass).

Preparation of Black Pigment Dispersion K2

The following components were mixed, and were heated to 70° C. in a water bath, so as to dissolve a polymer dispersing agent completely under agitation.

| | |
|---|---|
| Polymer dispersing agent: JONCRYL683 (produced by BASF) | 10.0 parts |
| 2-Pyrrolidone | 10.0 parts |
| Potassium hydroxide | 1.35 parts |
| Ion-exchanged water | 63.65 parts |

The resulting solution was blended with 15.0 parts of carbon black (NIPex 160 IQ; produced by Degussa) serving as a black pigment and premixing was performed for 30 minutes. Thereafter, a dispersion treatment (beads used: zirconia beads having a diameter of 0.05 mm, beads filling factor: 70 percent (in terms of bulk specific gravity), the number of revolutions of rotor: 42.1 Hz, dispersion time: 2 hours) was performed by using a beads mill UAM-015 (produced by KOTOBUKI ENGINEERING & MANUFACTURING CO., LTD.), so as to obtain Black pigment dispersion K2 (pigment content was 15.0 percent by mass).

Preparation of Cyan Pigment Dispersion C2

Cyan pigment dispersion C2 (pigment content was 15.0 percent by mass) was prepared in the same manner as Black pigment dispersion K2 except that the black pigment was changed to C. I. Pigment Blue 15:3 (IRGALITE Blue 8700; produced by Ciba Specialty Chemicals).

Preparation of Magenta Pigment Dispersion M2

Magenta pigment dispersion M2 (pigment content was 15.0 percent by mass) was prepared in the same manner as Black pigment dispersion K2 except that the black pigment was changed to C. I. Pigment Violet 19 (Hostajet Magenta E5B-PT VP3565; produced by Clariant (Japan) K.K.) serving as a magenta pigment.

Preparation of Yellow Pigment Dispersion Y2

Yellow pigment dispersion Y2 (pigment content was 15.0 percent by mass) was prepared in the same manner as Black pigment dispersion K2 except that the black pigment was changed to C. I. Pigment Yellow 155 (Graphtol Yellow 3GP; produced by Clariant (Japan) K.K.) serving as a yellow pigment.

Preparation of Ink

Ink 1

Black pigment dispersion K1, Polymer emulsion dispersion Em. 1, and Polymer aqueous solution 1 obtained as described above were mixed having the following composition.

| | |
|---|---|
| Black pigment dispersion K1 (pigment content was 15.0 percent by mass) | 14.0 percent by mass |
| Polymer emulsion dispersion Em. 1 (polymer content was 45.0 percent by mass) | 14.0 percent by mass |
| Polymer aqueous solution 1 (polymer content was 25.0 percent by mass) | 4.0 percent by mass |
| 2-Pyrrolidone | 23.0 percent by mass |

-continued

| | |
|---|---|
| Polyethylene glycol (average molecular weight was 600) | 5.0 percent by mass |
| 2-Methyl-1,3-propane diol | 8.0 percent by mass |
| Zonyl FSO-100 (surfactant: produced by Dupont) | 1.0 percent by mass |
| Ion-exchanged water | 31.0 percent by mass |

This was agitated sufficiently to disperse, so that Ink 1 was prepared.

Inks 13 to 18, 25 to 30, and 66 to 83

Inks 13 to 18, 25 to 30, and 66 to 83 were obtained in the same manner as Ink 1 except that Polymer aqueous solution 1 was changed to Polymer aqueous solutions 13 to 18, to 30, and 66 to 83.

Ink 2

Black pigment dispersion K1, Polymer emulsion dispersion Em. 2, and Polymer aqueous solution 2 obtained as described above were mixed having the following composition.

| | |
|---|---|
| Black pigment dispersion K1 (pigment content was 15.0 percent by mass) | 14.0 percent by mass |
| Polymer emulsion dispersion Em. 2 (polymer content was 45.0 percent by mass) | 14.0 percent by mass |
| Polymer aqueous solution 2 (polymer content was 25.0 percent by mass) | 4.0 percent by mass |
| 2-Pyrrolidone | 23.0 percent by mass |
| Polyethylene glycol (average molecular weight was 600) | 5.0 percent by mass |
| 1,2-Propane diol | 8.0 percent by mass |
| Zonyl FSO-100 (surfactant: produced by Dupont) | 1.0 percent by mass |
| Ion-exchanged water | 31.0 percent by mass |

This was agitated sufficiently to disperse, so that Ink 2 was prepared.

Inks 3 to 7, 19 to 24, and 60 to 65

Inks 3 to 7, 19 to 24, and 60 to 65 were obtained in the same manner as Ink 2 except that Polymer aqueous solution 2 was changed to Polymer aqueous solutions 3 to 7, 19 to 24, and 60 to 65.

Ink 8

Black pigment dispersion K2, Polymer emulsion dispersion Em. 3, and Polymer aqueous solution 8 obtained as described above were mixed having the following composition.

| | |
|---|---|
| Black pigment dispersion K2 (pigment content was 15.0 percent by mass) | 14.0 percent by mass |
| Polymer emulsion dispersion Em. 3 (polymer content was 45.0 percent by mass) | 14.0 percent by mass |
| Polymer aqueous solution 8 (polymer content was 25.0 percent by mass) | 4.0 percent by mass |
| 2-Pyrrolidone | 25.0 percent by mass |
| Polyethylene glycol (average molecular weight was 600) | 5.0 percent by mass |
| 2-Methyl-1,3-propane diol | 9.0 percent by mass |
| Zonyl FSO-100 (surfactant: produced by Dupont) | 1.0 percent by mass |
| Ion-exchanged water | 28.0 percent by mass |

This was agitated sufficiently to disperse, so that Ink 8 was prepared.

Inks 9 to 12, 31 to 36, and 48 to 53

Inks 9 to 12, 31 to 36, and 48 to 53 were obtained in the same manner as Ink 8 except that Polymer aqueous solution 8 was changed to Polymer aqueous solutions 9 to 12, 31 to 36, and 48 to 53.

Ink 37

Black pigment dispersion K2, Polymer emulsion dispersion Em. 4, and Polymer aqueous solution 37 obtained as described above were mixed having the following composition.

| | |
|---|---|
| Black pigment dispersion K2 (pigment content was 15.0 percent by mass) | 14.0 percent by mass |
| Polymer emulsion dispersion Em. 4 (polymer content was 45.0 percent by mass) | 14.0 percent by mass |
| Polymer aqueous solution 37 (polymer content was 25.0 percent by mass) | 4.0 percent by mass |
| 2-Pyrrolidone | 24.0 percent by mass |
| Polyethylene glycol (average molecular weight was 600) | 3.0 percent by mass |
| 1,2-Propane diol | 9.0 percent by mass |
| Zonyl FSO-100 (surfactant: produced by Dupont) | 1.0 percent by mass |
| Ion-exchanged water | 31.0 percent by mass |

This was agitated sufficiently to disperse, so that Ink 37 was prepared.

Inks 38 to 47 and 54 to 59

Inks 38 to 47 and 54 to 59 were obtained in the same manner as Ink 37 except that Polymer aqueous solution 37 was changed to Polymer aqueous solutions 38 to 47 and 54 to 59.

Ink 84

Ink 84 was obtained in the same manner as Ink 1 except that Polymer aqueous solution 1 was changed to 0 percent by mass and the ion-exchanged water was changed to 36.0 percent by mass.

Ink 85

Ink 85 was obtained in the same manner as Ink 1 except that Polymer emulsion dispersion Em. 1 and Polymer aqueous solution 1 were changed to 0 percent by mass and the ion-exchanged water was changed to 50.0 percent by mass.

Ink 86

Ink 86 was obtained in the same manner as Ink 1 except that Black pigment dispersion K1 was changed to 0 percent by mass and the ion-exchanged water was changed to 46.0 percent by mass.

Ink 87

Cyan pigment dispersion C1, Polymer emulsion dispersion Em. 1, and Polymer aqueous solution 1 obtained as described above were mixed having the following composition.

| | |
|---|---|
| Cyan pigment dispersion C1 (pigment content was 10.0 percent by mass) | 17.0 percent by mass |
| Polymer emulsion dispersion Em. 1 (polymer content was 45.0 percent by mass) | 15.0 percent by mass |
| Polymer aqueous solution 1 (polymer content was 25.0 percent by mass) | 4.0 percent by mass |
| 2-Pyrrolidone | 25.0 percent by mass |
| Polyethylene glycol (average molecular weight was 600) | 5.0 percent by mass |
| 2-Methyl-1,3-propane diol | 9.0 percent by mass |
| Zonyl FSO-100 (surfactant: produced by Dupont) | 1.0 percent by mass |
| Ion-exchanged water | 24.0 percent by mass |

This was agitated sufficiently to disperse, so that Ink 87 was prepared.

Ink 88

Ink 88 was obtained in the same manner as Ink 87 except that Cyan pigment dispersion C1 was changed to Cyan pigment dispersion C2 (pigment content was 15.0 percent by mass).

Ink 89

Magenta pigment dispersion M1, Polymer emulsion dispersion Em. 1, and Polymer aqueous solution 1 obtained as described above were mixed having the following composition.

| | |
|---|---|
| Magenta pigment dispersion M1 (pigment content was 10.0 percent by mass) | 37.0 percent by mass |
| Polymer emulsion dispersion Em. 1 (polymer content was 45.0 percent by mass) | 12.0 percent by mass |
| Polymer aqueous solution 1 (polymer content was 25.0 percent by mass) | 4.0 percent by mass |
| 2-Pyrrolidone | 20.0 percent by mass |
| Polyethylene glycol (average molecular weight was 600) | 3.0 percent by mass |
| 2-Methyl-1,3-propane diol | 7.0 percent by mass |
| Zonyl FSO-100 (surfactant: produced by Dupont) | 1.0 percent by mass |
| Ion-exchanged water | 16.0 percent by mass |

This was agitated sufficiently to disperse, so that Ink 89 was prepared.

Ink 90

Ink 90 was obtained in the same manner as Ink 89 except that Magenta pigment dispersion M1 was changed to Magenta pigment dispersion M2 (pigment content was 15.0 percent by mass).

Ink 91

Yellow pigment dispersion Y1, Polymer emulsion dispersion Em. 1, and Polymer aqueous solution 1 obtained as described above were mixed having the following composition.

| | |
|---|---|
| Yellow pigment dispersion Y1 (pigment content was 10.0 percent by mass) | 39.0 percent by mass |
| Polymer emulsion dispersion Em. 1 (polymer content was 45.0 percent by mass) | 13.0 percent by mass |
| Polymer aqueous solution 1 (polymer content was 25.0 percent by mass) | 4.0 percent by mass |
| 2-Pyrrolidone | 21.0 percent by mass |
| Polyethylene glycol (average molecular weight was 600) | 5.0 percent by mass |
| 2-Methyl-1,3-propane diol | 7.0 percent by mass |
| Zonyl FSO-100 (surfactant: produced by Dupont) | 1.0 percent by mass |
| Ion-exchanged water | 10.0 percent by mass |

This was agitated sufficiently to disperse, so that Ink 91 was prepared.

Ink 92

Ink 92 was obtained in the same manner as Ink 91 except that Yellow pigment dispersion Y1 was changed to Yellow pigment dispersion Y2 (pigment content was 15.0 percent by mass).

Ink 93

Ink 93 was obtained in the same manner as Ink 1 except that the pigment used for Black pigment dispersion K1 was changed to C. I. Food Black 2 serving as a dye.

Ink 94

Black pigment dispersion K1, Polyurethane polymer emulsion dispersion (JONCRYL 790: produced by BASF, polymer content was 48.0 percent by mass, average particle diameter D was 0.20 µm), and Polymer aqueous solution 1 obtained as described above were mixed having the following composition.

| | |
|---|---|
| Black pigment dispersion K1 (pigment content was 15.0 percent by mass) | 14.0 percent by mass |
| JONCRYL 790 | 8.3 percent by mass |
| Polymer aqueous solution 1 (polymer content was 25.0 percent by mass) | 4.0 percent by mass |
| 2-Pyrrolidone | 18.0 percent by mass |
| Polyethylene glycol (average molecular weight was 600) | 3.0 percent by mass |
| 2-Methyl-1,3-propane diol | 8.0 percent by mass |
| Zonyl FSO-100 (surfactant: produced by Dupont) | 1.0 percent by mass |
| NIKKOL BC-20 (produced by Nikko Chemicals Co., Ltd.) | 0.5 percent by mass |
| Ion-exchanged water | 43.2 percent by mass |

This was agitated sufficiently to disperse, so that Ink 94 was prepared.

Evaluation

According to aspects of the present invention, regarding the evaluation criteria in the following individual evaluation items, AA to B were favorable levels, and C and D were unacceptable levels. Regarding Example 72, a cartridge filled with Ink 85 and a cartridge filled with Ink 86 were mounted on an ink jet recording apparatus separately, a recorded article was produced by performing recording in such a way that Ink 86 was superposed on the region in which Ink 85 was recorded. Then the ejection stability of the ink and the scratch resistance of the image were evaluated by using the resulting recorded article. The storage stability of the ink was evaluated by using only Ink 86.

Ejection Stability of Ink

Each of the inks obtained as described above was filled into an ink cartridge, and the ink cartridge was mounted on the ink jet recording apparatus PIXUS Pro9500 (produced by CANON KABUSHIKI KAISHA). Then, solid images (image with recording duty of 100%) of 17 cm×25 cm were printed on Canon Photo Paper Glossy Gold GL-101 (produced by CANON KABUSHIKI KAISHA), where a recording mode was "Canon Photo Paper Glossy Gold Standard mode". Regarding the above-described ink jet printing apparatus, the condition in which four droplets of ink having a volume of 4 µL per droplet were applied in a unit region of 1/600 inch×1/600 inch, where the resolution was 600 dpi×600 dpi, was defined as a recording duty of 100%. Regarding the recorded article obtained at this time, the optical density of the solid image was measured by using a reflection densitometer (RD-191; produced by Gretag Macbeth). Then, the ratio $DR_1=OD_{100}/OD_1$ of $OD_{100}$ to $OD_1$ was calculated, where the optical density of the image of the first sheet was represented by $OD_1$, and the optical density of the image of the hundredth sheet was represented by $OD_{100}$, and the ejection stability of the ink was evaluated. The evaluation criteria of the ejection stability of the ink were as described below. The evaluation results are shown in Table 8.

AA: $0.9 \leq DR_1$
A: $0.7 \leq DR_1 < 0.9$
B: $0.5 \leq DR_1 < 0.7$
C: $DR_1 < 0.5$
D: Printing was not able to be performed up to the hundredth sheet.

Scratch Resistance of Image

Each of the inks obtained as described above was filled into an ink cartridge, and the ink cartridge was mounted on an ink jet recording apparatus, imagePROGRAF iPF6000S (produced by CANON KABUSHIKI KAISHA). Then, a solid image (image with recording duty of 100%) of 6 cm×13 cm was printed on LLJET Glossy PVC Gray Glue EX LLSPEX113 (produced by SAKURAI CO., LTD.) serving as a nonpermeable recording medium, where a recording mode was "Photo Glossy Paper Photo Quality mode". Regarding the above-described ink jet printing apparatus, the condition in which four droplets of ink having a volume of 4 μL per droplet were applied in a unit region of 1/600 inch×1/600 inch, where the resolution was 600 dpi×600 dpi, was defined as a recording duty of 100%. In this regard, a platen was formed from an aluminum alloy which was produced by a die casting method and which was not easily thermally deformed, a nickel alloy heater was disposed at the lower portion of the platen, and recording was performed while the recording medium was heated by heating the platen. The heating temperature was set in such a way that the recording medium surface temperature became 60° C. A solid image of the recorded article obtained at this time was rubbed 50 times with a rubbing white cloth specified in JIS L0805 by a method on the basis of JIS L0849, and the optical density of the solid image before and after rubbing was measured by using the reflection densitometer (RD-191; produced by Gretag Macbeth). Then, the ratio $DR_2 = OD_{50}/OD_0$ of $OD_{50}$ to $OD_0$ was calculated, where the optical density of the image before rubbing was represented by $OD_0$ and the optical density of the image after 50 times of rubbing was represented by $OD_{50}$, and the scratch resistance of the image was evaluated. The evaluation criteria of the scratch resistance were as described below. The evaluation results are shown in Table 8.

AA: $0.9 \leq DR_2$
A: $0.7 \leq DR_2 < 0.9$
B: $0.5 \leq DR_2 < 0.7$
C, $0.3 \leq DR_2 < 0.5$
D: $DR_2 < 0.3$ Storage Stability of Ink Each of the inks obtained as described above was put into a Teflon (trademark) container and was stored at a temperature of 60° C. for one weak. Regarding each of the inks before and after the storage test, the average particle diameter (volume average particle diameter) of the pigment was measured by using Nanotrac particle size distribution measuring apparatus (UPA-EX150; produced by NIKKISO CO., LTD.). The storage stability of the ink was evaluated by calculating the ratio $P = D_1/D_0$ of $D_1$ to $D_0$, where the average particle diameter of the pigment in the ink before the storage test was represented by $D_0$ and the average particle diameter of the pigment in the ink after the storage test was represented by $D_1$. The evaluation criteria of the storage stability of the ink were as described below. The evaluation results are shown in Table 8.

AA: $0.9 \leq P < 1.2$
A: $0.7 \leq P < 0.9$ or $1.2 \leq P < 1.5$
B: $0.5 \leq P < 0.7$ or $1.5 \leq P < 1.8$
C: $P < 0.5$ or $1.8 \leq P < 2.0$
D: After the storage test, pigments were aggregated.

TABLE 8

Composition and evaluation result of ink

| Example | Ink No. | Ejection stability of ink | Scratch resistance of image | Storage stability of ink |
|---|---|---|---|---|
| Example 1 | 1 | AA | AA | AA |
| Example 2 | 2 | B | B | B |
| Example 3 | 3 | A | B | B |
| Example 4 | 4 | A | B | A |
| Example 5 | 5 | A | B | A |
| Example 6 | 6 | A | B | A |
| Example 7 | 7 | B | B | A |
| Example 8 | 8 | B | B | B |
| Example 9 | 9 | A | B | B |
| Example 10 | 10 | A | A | B |
| Example 11 | 11 | A | A | B |
| Example 12 | 12 | B | A | B |
| Example 13 | 13 | A | B | B |
| Example 14 | 14 | A | A | B |
| Example 15 | 15 | A | A | B |
| Example 16 | 16 | A | AA | B |
| Example 17 | 17 | A | AA | B |
| Example 18 | 18 | B | AA | B |
| Example 19 | 19 | B | A | A |
| Example 20 | 20 | B | A | A |
| Example 21 | 21 | B | A | A |
| Example 22 | 22 | B | A | A |
| Example 23 | 23 | B | A | A |
| Example 24 | 24 | B | A | B |
| Example 25 | 25 | A | B | B |
| Example 26 | 26 | A | A | B |
| Example 27 | 27 | A | A | B |
| Example 28 | 28 | A | A | B |
| Example 29 | 29 | A | A | B |
| Example 30 | 30 | B | A | B |
| Example 31 | 31 | A | B | B |
| Example 32 | 32 | A | A | B |
| Example 33 | 33 | A | A | B |
| Example 34 | 34 | A | A | B |
| Example 35 | 35 | A | A | B |
| Example 36 | 36 | B | A | B |
| Example 37 | 37 | A | AA | AA |
| Example 38 | 38 | AA | AA | AA |
| Example 39 | 39 | AA | AA | AA |
| Example 40 | 40 | AA | AA | AA |
| Example 41 | 41 | AA | AA | AA |
| Example 42 | 42 | AA | A | AA |
| Example 43 | 43 | A | AA | AA |
| Example 44 | 44 | AA | AA | AA |
| Example 45 | 45 | AA | AA | AA |
| Example 46 | 46 | AA | AA | AA |
| Example 47 | 47 | A | AA | AA |
| Example 48 | 48 | AA | A | AA |
| Example 49 | 49 | AA | AA | AA |
| Example 50 | 50 | AA | AA | AA |
| Example 51 | 51 | AA | AA | AA |
| Example 52 | 52 | AA | AA | AA |
| Example 53 | 53 | A | AA | AA |
| Example 54 | 54 | AA | AA | AA |
| Example 55 | 55 | AA | AA | AA |
| Example 56 | 56 | AA | AA | AA |
| Example 57 | 57 | AA | AA | AA |
| Example 58 | 58 | AA | AA | AA |
| Example 59 | 59 | AA | AA | A |
| Example 60 | 60 | AA | A | AA |
| Example 61 | 61 | AA | AA | AA |
| Example 62 | 62 | AA | AA | AA |
| Example 63 | 63 | AA | AA | AA |
| Example 64 | 64 | A | AA | AA |
| Example 65 | 65 | B | AA | AA |
| Example 66 | 66 | AA | A | AA |
| Example 67 | 67 | AA | AA | AA |
| Example 68 | 68 | AA | AA | AA |
| Example 69 | 69 | AA | AA | AA |
| Example 70 | 70 | AA | AA | AA |
| Example 71 | 71 | A | AA | AA |
| Example 72 | 85 + 86 | AA | AA | AA |
| Example 73 | 87 | AA | AA | AA |
| Example 74 | 88 | AA | AA | AA |
| Example 75 | 89 | AA | AA | AA |
| Example 76 | 90 | AA | AA | AA |

TABLE 8-continued

Composition and evaluation result of ink

| Example | Ink No. | Ejection stability of ink | Scratch resistance of image | Storage stability of ink |
|---|---|---|---|---|
| Example 77 | 91 | AA | AA | AA |
| Example 78 | 92 | AA | AA | AA |
| Example 79 | 93 | AA | AA | AA |
| Example 80 | 94 | AA | AA | AA |
| Comparative example 1 | 72 | D | D | B |
| Comparative example 2 | 73 | D | C | B |
| Comparative example 3 | 74 | C | D | B |
| Comparative example 4 | 75 | C | B | C |
| Comparative example 5 | 76 | C | B | C |
| Comparative example 6 | 77 | D | B | D |
| Comparative example 7 | 78 | C | B | C |
| Comparative example 8 | 79 | C | B | B |
| Comparative example 9 | 80 | C | B | C |
| Comparative example 10 | 81 | C | B | C |
| Comparative example 11 | 82 | D | B | D |
| Comparative example 12 | 83 | D | D | C |
| Comparative example 13 | 84 | D | D | D |

According to the examples, an ink jet aqueous ink exhibiting excellent storage stability and ejection stability and producing an image exhibiting high scratch resistance can be provided. Furthermore, the examples show an ink cartridge by using the above-described ink jet aqueous ink and an ink jet recording method can be provided.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-194044 filed Aug. 31, 2010, which is hereby incorporated by reference herein in its entirety.

What is claimed is:
1. An ink jet aqueous ink comprising:
an ABC triblock polymer and a polymer emulsion,
wherein the ABC triblock polymer is formed from an A block having a unit represented by the following general formula (1), a B block having a unit represented by the following general formula (2), and a C block having a unit represented by the following general formula (3),

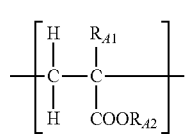

General formula (1)

in the general formula (1), $R_{A1}$ represents a hydrogen atom or a methyl group and $R_{A2}$ represents an alkyl group having the carbon number of 1 to 8 or a cycloalkyl group having the carbon number of 4 to 8,

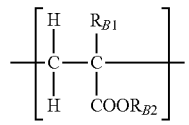

General formula (2)

in the general formula (2), $R_{B1}$ represents a hydrogen atom or a methyl group and $R_{B2}$ represents an alkyl group having the carbon number of 4 to 8, a cycloalkyl group having the carbon number of 4 to 8, or a hydroxy alkyl group having the carbon number of 2 to 8, and

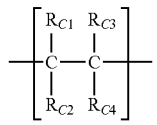

General formula (3)

in the general formula (3), at least one of $R_{C1}$ to $R_{C4}$ is a —COOH group, an —$R_{C5}$—COOH group, or a salt thereof, the remainder is a hydrogen atom, an alkyl group having the carbon number of 1 to 8, or a cycloalkyl group having the carbon number of 4 to 8, and $R_{C5}$ is an alkylene group having the carbon number of 1 to 5.

2. The ink jet aqueous ink according to claim 1, comprising a pigment.

3. The ink jet aqueous ink according to claim 1, wherein an acid value of the ABC triblock polymer is 20 mgKOH/g or more and 100 mgKOH/g or less.

4. The ink jet aqueous ink according to claim 1, wherein the proportion (percent by mass) of the A block in the ABC triblock polymer is 40.0 percent by mass or more and 80.0 percent by mass or less relative to a total mass of the ABC triblock polymer.

5. The ink jet aqueous ink according to claim 1, wherein the number average molecular weight of the ABC triblock polymer is 1,000 or more and 30,000 or less.

6. The ink jet aqueous ink according to claim 1, wherein the ABC triblock polymer has a molecular weight distribution satisfying 1.0≤(weight average molecular weight)/(number average molecular weight)≤2.0.

7. The ink jet aqueous ink according to claim 1, wherein the proportion (percent by mass) of the A block in the ABC triblock polymer is 3.5 times or more and 30.0 times or less the proportion (percent by mass) of units derived from all acidic monomers contained in the ABC triblock polymer.

8. The ink jet aqueous ink according to claim 1, wherein the ratio of the number average molecular weight of the ABC triblock polymer to the acid value of the ABC triblock polymer is 50 or more and 300 or less.

9. An ink cartridge comprising an ink storage portion to store an ink, wherein the ink stored in the ink storage portion is the ink jet aqueous ink according to claim 1.

10. An ink jet recording method comprising the step of ejecting an ink by an ink jet method from an ink jet recording head to perform recording on a recording medium, wherein the ink is the ink jet aqueous ink according to claim 1.

11. The ink jet recording method according to claim 10, further comprising the step of heating the recording medium before application of the ink to the recording medium.

* * * * *